(12) United States Patent
Rousseau et al.

(10) Patent No.: US 8,566,369 B2
(45) Date of Patent: Oct. 22, 2013

(54) COMPUTER-BASED TOOL FOR MANAGING DIGITAL DOCUMENTS

(75) Inventors: Guillaume Rousseau, Paris (FR); Maxime Biais, Paris (FR)

(73) Assignee: Inria Institut National de Recherche en Informatique et en Automatique, Rocquencourt, Le Chesnay Cedex (FR)

( * ) Notice: Subject to any disclaimer, the term of this patent is extended or adjusted under 35 U.S.C. 154(b) by 142 days.

(21) Appl. No.: 12/312,168

(22) PCT Filed: Oct. 25, 2007

(86) PCT No.: PCT/FR2007/001766
§ 371 (c)(1),
(2), (4) Date: Jun. 23, 2009

(87) PCT Pub. No.: WO2008/059124
PCT Pub. Date: May 22, 2008

(65) Prior Publication Data
US 2010/0049760 A1 Feb. 25, 2010

(30) Foreign Application Priority Data

Oct. 27, 2006 (FR) ...................................... 06 09464

(51) Int. Cl.
*G06F 17/30* (2006.01)
(52) U.S. Cl.
USPC .......................................................... 707/821
(58) Field of Classification Search
None
See application file for complete search history.

(56) References Cited

U.S. PATENT DOCUMENTS

| | | | |
|---|---|---|---|
| 6,282,698 B1 | 8/2001 | Baker et al. | |
| 6,658,423 B1 | 12/2003 | Pugh et al. | |
| 6,931,537 B1* | 8/2005 | Takura et al. | 713/178 |
| 2006/0041597 A1 | 2/2006 | Conrad et al. | |
| 2006/0104518 A1* | 5/2006 | Yang et al. | 382/224 |
| 2007/0168671 A1* | 7/2007 | Takenaka et al. | 713/176 |

OTHER PUBLICATIONS

Yang, et al., "Near-Duplicate Detection by Instance-level Constrained Clustering," SIGIR'06, Aug. 6, 2006-Aug. 11, 2006, Seattle, Washington, USA, pp. 421-428 XP-002443932.

* cited by examiner

*Primary Examiner* — Dinku Gebresenbet
(74) *Attorney, Agent, or Firm* — Christie, Parker & Hale, LLP

(57) ABSTRACT

The invention relates to a computer device for managing documents, in particular software projects developed in cooperation. A memory stores contents of documents having time references. An extractor separates the document contents into document elements. A signature generator returns signatures of element contents. An imprint generator associates for each document the time reference thereof and the signatures of its elements. A time clock module calculates the results of a time election function. A supervisor operates the generator on the document contents. For each signature value, it calls the time clock module with a list of imprint time references containing the signature value. A unified time reference is obtained for each signature value. Each signature value and its unified time reference are stored.

28 Claims, 15 Drawing Sheets

Figure 1:
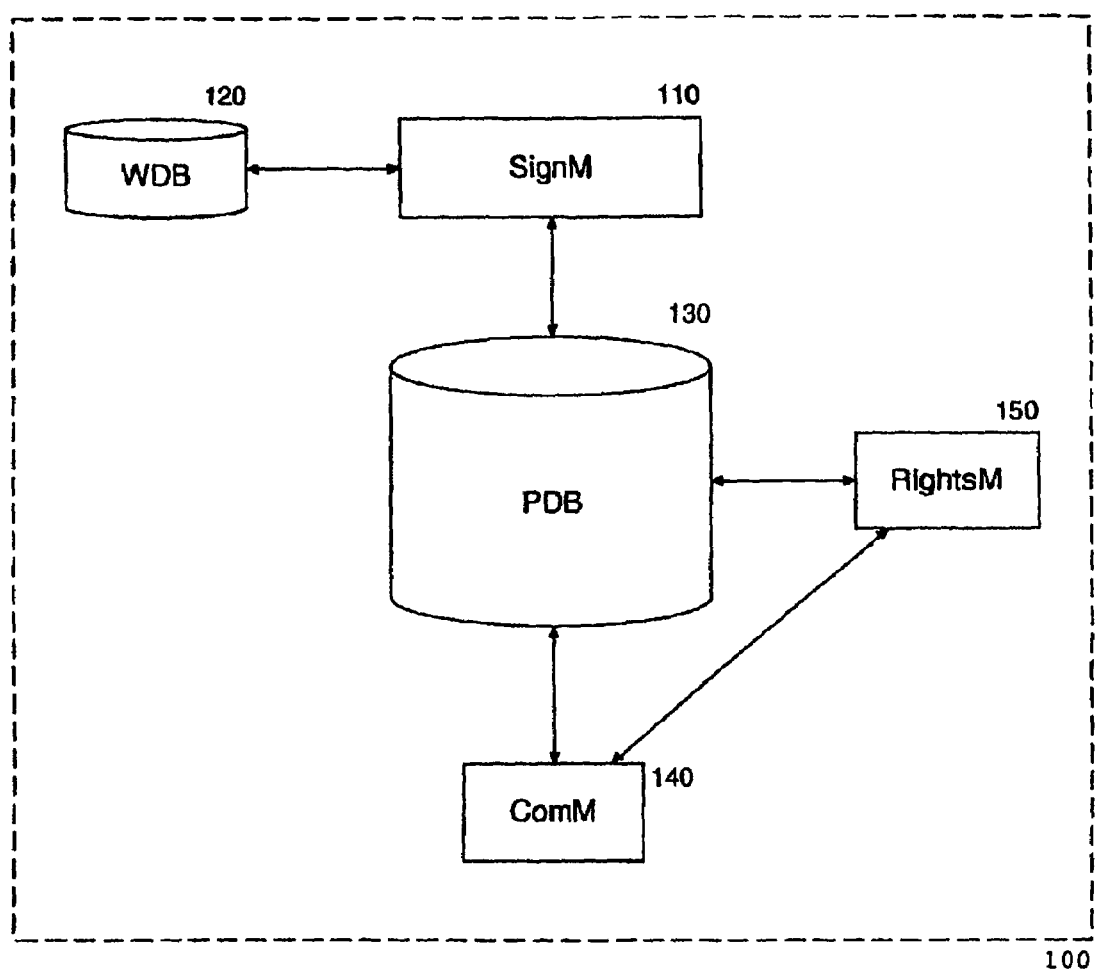

| COL | 301 | 302 | 303 | 304 | 305 | 306 | 307 | 308 | ROW |
|---|---|---|---|---|---|---|---|---|---|
| | 1 | 1 | 1 | 1 | N1,1,1,1 | AE1,1,1,1 | T11 | A11 | 301 |
| | 1 | 1 | 1 | 2 | N1,1,1,2 | AE1,1,1,2 | T11 | A11 | 302 |
| | ... | ... | ... | ... | ... | ... | ... | ... | 303 |
| | 1 | 1 | 1 | K111 | N1,1,1,K111 | AE1,1,1,K111 | T11 | A11 | 304 |
| 300 | 1 | 1 | 2 | 1 | N1,1,2,1 | AE1,1,2,1 | T11 | A11 | 305 |
| | 1 | 1 | 2 | 2 | N1,1,2,2 | AE1,1,2,2 | T11 | A11 | 306 |
| | ... | ... | ... | ... | ... | ... | ... | ... | 307 |
| | 1 | 1 | 2 | K112 | N1,1,2,K112 | AE1,1,2,K112 | T11 | A11 | 308 |
| | ... | ... | ... | ... | ... | ... | ... | ... | 309 |
| 304 | 1 | 1 | L11 | 1 | N1,1,L11,1 | AE1,1,L11,1 | T11 | A11 | 310 |
| | 1 | 1 | L11 | 2 | N1,1,L11,2 | AE1,1,L11,2 | T11 | A11 | 311 |
| | ... | ... | ... | ... | ... | ... | ... | ... | 312 |
| | 1 | 1 | L11 | K11L11 | N1,1,L11,K11L11 | AE1,1,L11,K11L11 | T11 | A11 | 313 |
| | 1 | 2 | 1 | 1 | N1,2,1,1 | AE1,2,1,1 | T12 | A12 | 314 |
| | 1 | 2 | 1 | 2 | N1,2,1,2 | AE1,2,1,2 | T12 | A12 | 315 |
| | ... | ... | ... | ... | ... | ... | ... | ... | 316 |
| | 1 | 2 | 1 | K121 | N1,2,1,K121 | AE1,2,1,K121 | T12 | A12 | 317 |
| | 1 | 2 | 2 | 1 | N1,2,2,1 | AE1,2,2,1 | T12 | A12 | 318 |
| 306 | 1 | 2 | 2 | 2 | N1,2,2,2 | AE1,2,2,2 | T12 | A12 | 319 |
| | ... | ... | ... | ... | ... | ... | ... | ... | 320 |
| | 1 | 2 | 2 | K122 | N1,2,2,K122 | AE1,2,2,K122 | T12 | A12 | 321 |
| | ... | ... | ... | ... | ... | ... | ... | ... | 322 |
| | 1 | 2 | L12 | 1 | N1,2,L12,1 | AE1,2,L12,1 | T12 | A12 | 323 |
| | 1 | 2 | L12 | 2 | N1,2,L12,2 | AE1,2,L12,2 | T12 | A12 | 324 |
| | ... | ... | ... | ... | ... | ... | ... | ... | 325 |
| | 1 | 2 | L12 | K12L12 | N1,2,L12,K12L12 | AE1,2,L12,K12L12 | T12 | A12 | 326 |
| | ... | ... | ... | ... | ... | ... | ... | ... | 327 |
| | 1 | J1 | 1 | 1 | N1,J1,1,1 | AE1,J1,1,1 | T1J1 | A1J1 | 328 |
| | 1 | J1 | 1 | 2 | N1,J1,1,2 | AE1,J1,1,2 | T1J1 | A1J1 | 329 |
| | ... | ... | ... | ... | ... | ... | ... | ... | 330 |
| | 1 | J1 | 1 | K1J11 | N1,J1,1,K1J11 | AE1,J1,1,K1J11 | T1J1 | A1J1 | 331 |
| | 1 | J1 | 2 | 1 | N1,J1,2,1 | AE1,J1,2,1 | T1J1 | A1J1 | 332 |
| | 1 | J1 | 2 | 2 | N1,J1,2,2 | AE1,J1,2,2 | T1J1 | A1J1 | 333 |
| | ... | ... | ... | ... | ... | ... | ... | ... | 334 |
| | 1 | J1 | 2 | K1J12 | N1,J1,2,K1J12 | AE1,J1,2,K1J12 | T1J1 | A1J1 | 335 |
| | 1 | J1 | L1J1 | 1 | N1,J1,L1J1,1 | AE1,J1,L1J1,1 | T1J1 | A1J1 | 336 |
| | 1 | J1 | L1J1 | 2 | N1,J1,L1J1,2 | AE1,J1,L1J1,2 | T1J1 | A1J1 | 337 |
| | ... | ... | ... | ... | ... | ... | ... | ... | 338 |
| 308 | 1 | J1 | L1J1 | K1J1L1J1 | N1,J1,L1J1,K1J1L1J1 | AE1,J1,L1J1,K1J1L1J1 | T1J1 | A1J1 | 339 |

Fig. 3

| COL | 601 | 602 | 603 | 604 | 605 | 606 | 607 | 608 | 609 | 610 | ROW |
|---|---|---|---|---|---|---|---|---|---|---|---|
| Nia | i | ia1 | la1 | ka1 | Ti,ia1 | AEi,ia1,la1,ka1 | AOi,ia1,la1 | Via | Wia | 601 |
| Nia | i | ia2 | la2 | ka2 | Ti,ia2 | AEi,ia2,la2,ka2 | AOi,ia2,la2 | Via | Wia | 602 |
| ... | ... | ... | ... | ... | ... | ... | ... | ... | ... | 603 |
| Nia | i | ian | lan | kan | Ti,ian | AEi,ian,lan,kan | AOi,ian,lan | Via | Wia | 604 |
| Nib | i | ib1 | lb1 | kb1 | Ti,ib1 | AEi,ib1,lb1,kb1 | AOi,ib1,lb1 | Vib | Wib | 605 |
| ... | ... | ... | ... | ... | ... | ... | ... | ... | ... | 606 |
| Nib | i | ibm | lbm | kbm | Ti,ibm | AEi,ibm,lbm,kbm | AOi,ibm,lbm | Vib | Wib | 607 |
| Niq | i | iq1 | lq1 | kq1 | Ti,iq1 | AEi,iq1,lq1,kq1 | AOi,iq1,lq1 | Viq | Wiq | 608 |
| ... | ... | ... | ... | ... | ... | ... | ... | ... | ... | 609 |
| Niq | i | iqp | lqp | kqp | Ti,iqp | AEi,iqp,lqp,kqp | AOi,iqp,lqp | Viq | Wiq | 610 |
| Niq | i | iqr | lqr | kqr | Ti,iqr | AEi,iqr,lqr,kqr | AOi,iqr,lqr | Viq | Wiq | 611 |

Fig. 6

| COL | 1101 | 1102 | 1103 | 1104 | 1105 | 1106 | 1107 | 1108 | 1109 | 1110 | ROW |
|---|---|---|---|---|---|---|---|---|---|---|---|
| | N1a | 1 | ja1 | la1 | ka1 | T1ja1 | AE1,ja1,la1,ka1 | AO1,ja1,la1 | V1a | W1a | 1101 |
| | N1a | 1 | ja2 | la2 | ka2 | T1ja2 | AE1,ja2,la2,ka2 | AO1,ja2,la2 | V1a | W1a | 1102 |
| | ... | ... | ... | ... | ... | ... | ... | ... | ... | ... | 1103 |
| | N1a | 1 | jan | lan | kan | T1jan | AE1,jan,lan,kan | AO1,jan,lan | V1a | W1a | 1104 |
| | N1b | 1 | jb1 | lb1 | kb1 | T1jb1 | AE1,jb1,lb1,kb1, | AO1,jb1,lb1 | V1b | W1b | 1105 |
| | ... | ... | ... | ... | ... | ... | ... | ... | ... | ... | 1106 |
| 1102 | N1b | 1 | jbm | lbm | kbm | T1jbm | AE1,jbm,lbm,kbm | AO1,jbm,jbm | V1b | W1b | 1107 |
| | ... | ... | ... | ... | ... | ... | ... | ... | ... | ... | 1108 |
| | N1q | 1 | jq1 | lq1 | kq1 | T1jq1 | AE1,jq1,lq1,kq1 | AO1,jq1,lq1 | V1q | W1q | 1109 |
| | ... | ... | ... | ... | ... | ... | ... | ... | ... | ... | 1110 |
| | N1q | 1 | jqp | lqp | kqp | T1jqp | AE1,jqp,lqp,kqp | AO1,jqp,lqp | V1q | W1q | 1111 |
| | ... | ... | ... | ... | ... | ... | ... | ... | ... | ... | 1112 |
| | N1q | 1 | jqr | lqr | kqr | T1jqr | AE1,jqr,lqr,kqr | AO1,jqr,lqr | V1q | W1q | 1113 |
| | N2a | 2 | ja1 | la1 | ka1 | T2ja1 | AE2,ja1,la1,ka1 | AO2,ja1,la1, | V2a | W2a | 1114 |
| | N2a | 2 | ja2 | la2 | ka2 | T2ja2 | AE2,ja2,la2,ka2 | AO2,ja2,la2, | V2a | W2a | 1115 |
| | ... | ... | ... | ... | ... | ... | ... | ... | ... | ... | 1116 |
| | N2a | 2 | jan | lan | kan | T2jan | AE2,jan,lan,kan | AO2,jan,lan | V2a | W2a | 1117 |
| | N2b | 2 | jb1 | lb1 | kb1 | T2jb1 | AE2,jb1,lb1,kb1 | AO2,jb1,lb1 | V2b | W2b | 1118 |
| | ... | ... | ... | ... | ... | ... | ... | ... | ... | ... | 1119 |
| 1104 | N2b | 2 | jbm | lbm | kbm | T2jbm | AE2,jbm,lbm,kbm | AO2,jbm,jbm | V2b | W2b | 1120 |
| | ... | ... | ... | ... | ... | ... | ... | ... | ... | ... | 1121 |
| | N2q | 2 | jq1 | lq1 | kq1 | T2jq1 | AE2,jq1,lq1,kq1 | AO2,jq1,lq1 | V2q | W2q | 1122 |
| | ... | ... | ... | ... | ... | ... | ... | ... | ... | ... | 1123 |
| | N2q | 2 | jqp | lqp | kqp | T2jqp | AE2,jqp,lqp,kqp | AO2,jqp,lqp | V2q | W2q | 1124 |
| | ... | ... | ... | ... | ... | ... | ... | ... | ... | ... | 1125 |
| | N2q | 2 | jqr | lqr | kqr | T2jqr | AE2,jqr,lqr,kqr | AO2,jqr,lqr | V2q | W2q | 1126 |
| | ... | ... | ... | ... | ... | ... | ... | ... | ... | ... | 1127 |
| | Nia | i | ja1 | la1 | ka1 | Tija1 | AEi,ja1,la1,ka1 | AOi,ja1,la1 | Via | Wia | 1128 |
| | Nia | i | ja2 | la2 | ka2 | Tija2 | AEi,ja2,la2,ka2 | AOi,ja2,la2 | Via | Wia | 1129 |
| | ... | ... | ... | ... | ... | ... | ... | ... | ... | ... | 1130 |
| | Nia | i | jan | lan | kan | Tijan | AEi,jan,lan,kan | AOi,jan,lan | Via | Wia | 1131 |
| | Nib | i | jb1 | lb1 | kb1 | Tijb1 | AEi,jb1,lb1,kb1 | AOi,jb1,lb1 | Vib | Wib | 1132 |
| | ... | ... | ... | ... | ... | ... | ... | ... | ... | ... | 1133 |
| 1106 | Nib | i | jbm | lbm | kbm | Tijbm | AEi,jbm,lbm,kbm | AOi,jbm,jbm | Vib | Wib | 1134 |
| | ... | ... | ... | ... | ... | ... | ... | ... | ... | ... | 1135 |
| | Niq | i | jq1 | lq1 | kq1 | Tijq1 | AEi,jq1,lq1,kq1 | AOi,jq1,lq1 | Viq | Wiq | 1136 |
| | ... | ... | ... | ... | ... | ... | ... | ... | ... | ... | 1137 |
| | Niq | i | jqp | lqp | kqp | Tijqp | AEi,jqp,lqp,kqp | AOi,jqp,lqp | Viq | Wiq | 1138 |
| | ... | ... | ... | ... | ... | ... | ... | ... | ... | ... | 1139 |
| | Niq | i | jqr | lqr | kqr | Tijqr | AEi,jqr,lqr,kqr | AOi,jqr,lqr | Viq | Wiq | 1140 |

Fig. 11

COMPUTER-BASED TOOL FOR MANAGING DIGITAL DOCUMENTS

CROSS-REFERENCE TO RELATED APPLICATION

This application is a National Phase Patent Application and claims the priority of International Application Number PCT/FR2007/001766, filed on Oct. 25, 2007, which claims priority of French Patent Application Number 0609464, filed on Oct. 27, 2006.

The invention relates to the processing of computer documents.

A computer document is basically a file of any kind, the contents of which may be made accessible to people, directly or indirectly. The accessibility may be fairly direct if the files are of a text type. Accessibility is less direct if the files in question are music or video files. Other examples will be considered later on.

File systems have long been organised so as to allow precise and, theoretically, exact dating of each file. Similarly, it is known to associate different attributes with a computer file in different ways. Basically, these attributes are linked to the computer nature of the file itself, for example the attributes "read only", "archive", "system" or "hidden". Alongside the attributes linked with the file system, other attributes may be associated with a file, for example in a header thereof. The computer system also makes it possible to compare documents. A "minimal" comparison can be carried out using only the attributes of the file system. This applies to every kind of file but is far from perfect: for example, it would view identical files having a different date system as being different. More highly developed comparisons are concerned with the content of the files. The details of the comparison thus differ depending on whether for example it is a "text" type file, or by contrast a binary file with, in between the two, files of a more highly developed nature such as image files, which are more difficult to compare.

The Applicant has observed that at present there is no technique which allows comparison to be carried out methodically and automatically at the same time as the elements of the comparison are accurately dated. The need for a technique of this type can be felt in different sectors such as that of determining the legal status of works for the purposes of copyright, more particularly works of the software type.

The present invention sets out to improve the situation.

The invention relates to a computer-based device for managing documents, comprising a memory for storing the contents of documents, having time references, the device comprising an extractor capable of breaking down a document content into elements, according to a given rule, a signature generator, capable of processing a document element in order to return a signature of its contents, an imprint generator, capable of establishing, for a document content, an imprint which comprises the time reference for this document content, as well as at least some of the signatures obtained by calling up the extractor in order to transform this document content into elements, then the signature generator for the elements thus obtained, a time clock module capable of calculating the results of a predetermined time election function from a list of time reference identifiers, and a supervisor arranged to operate the imprint generator on at least two document contents, thus producing two imprints, together having a plurality of signatures, repeatedly calling up the time clock module for each signature value, with on each occasion a list of at least some of the time reference identifiers of the imprints containing the same signature value, thus providing a unified time reference for each signature value, storing a correspondence between each signature value and its unified time reference.

Figure 2:
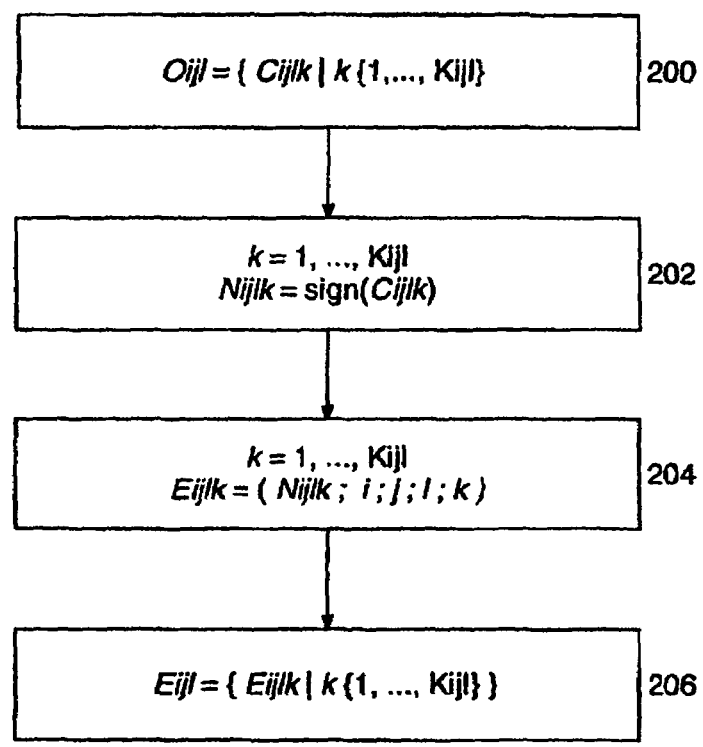
Figure 4:
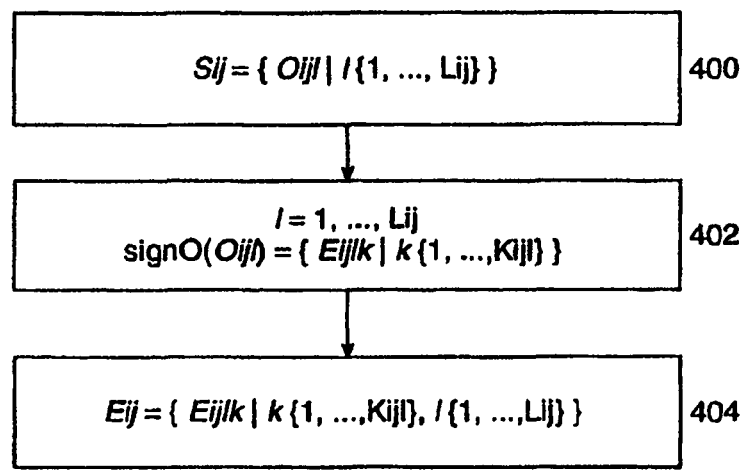
Figure 5:
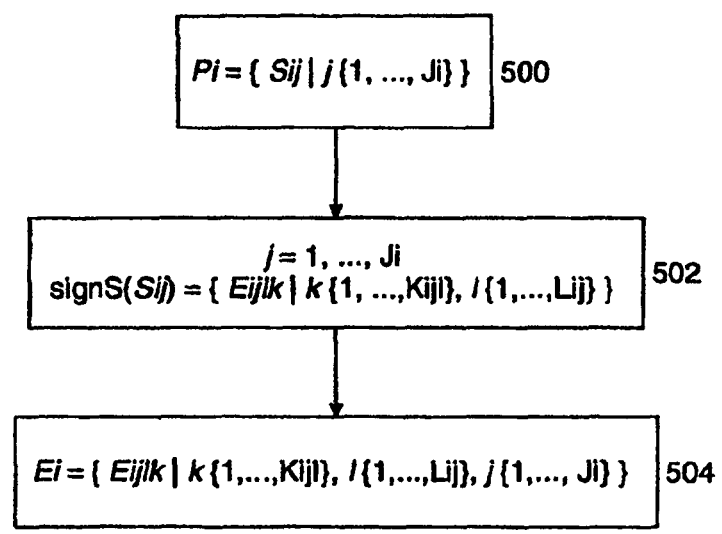
Figure 7:
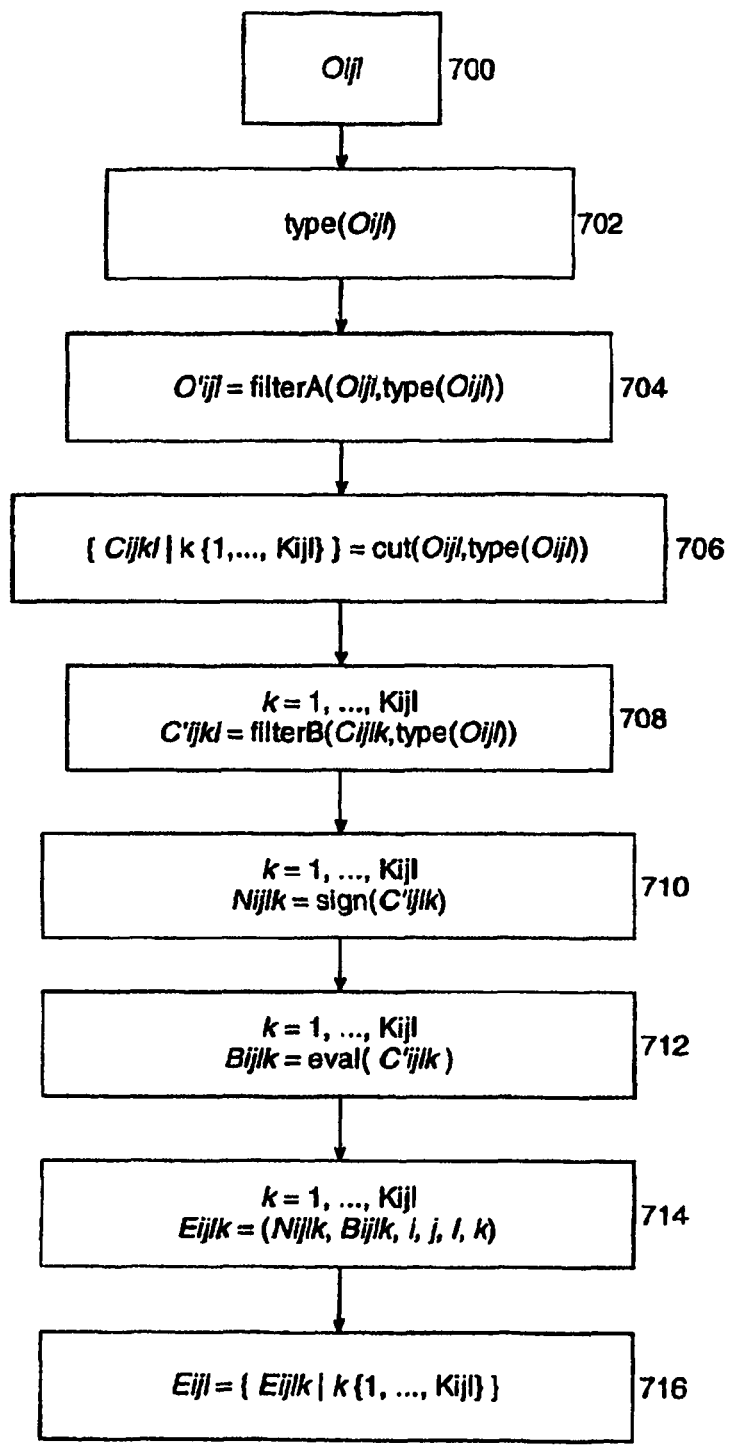
Figure 8:
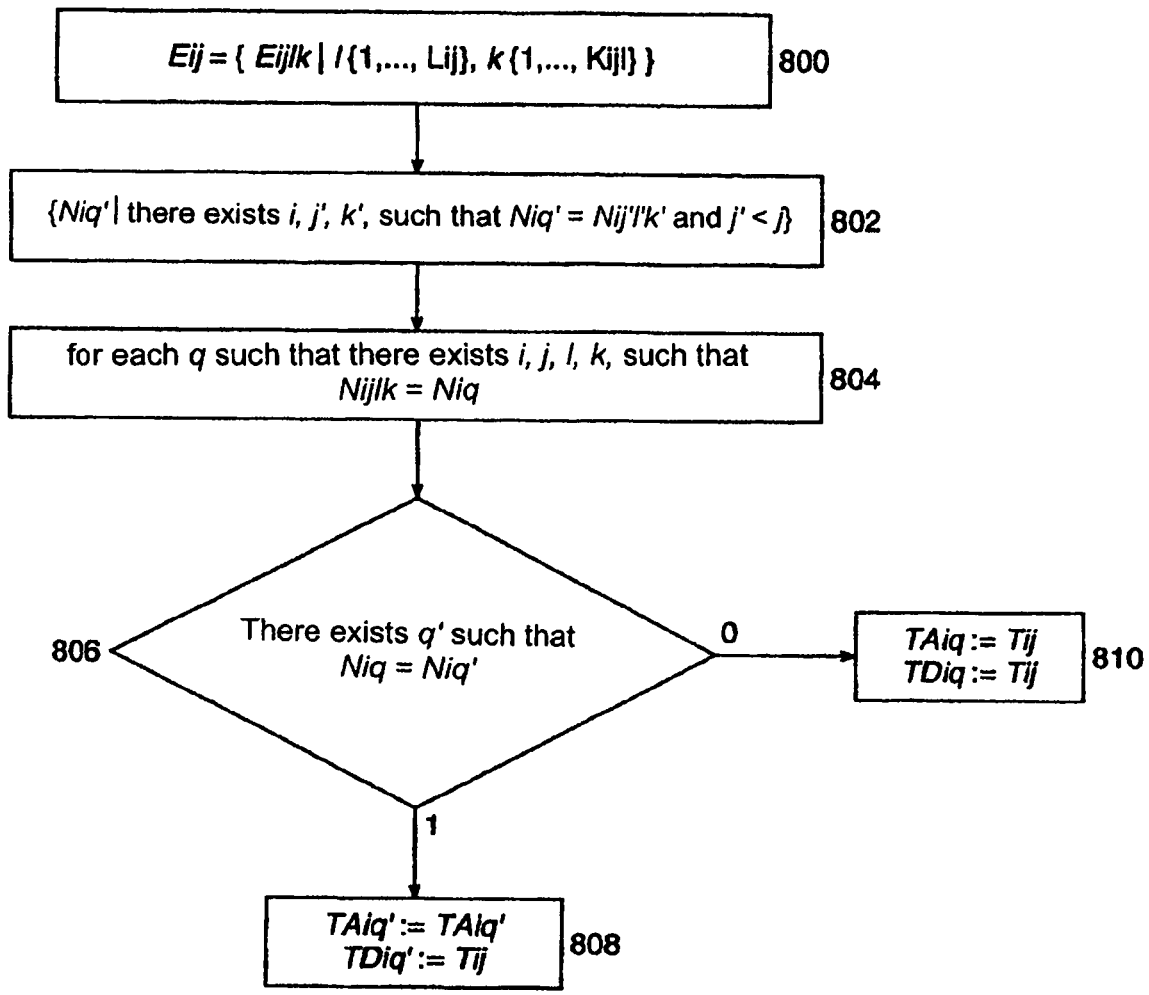
Figure 9:
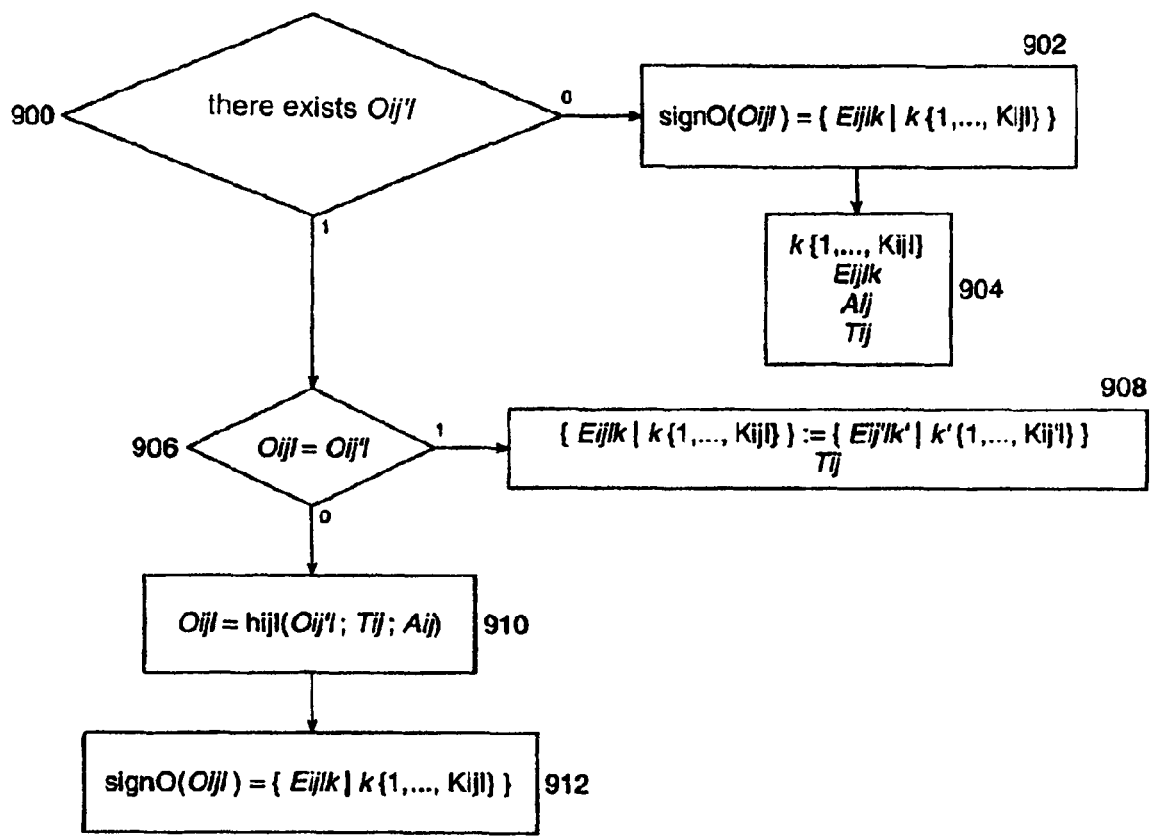
Figure 10:
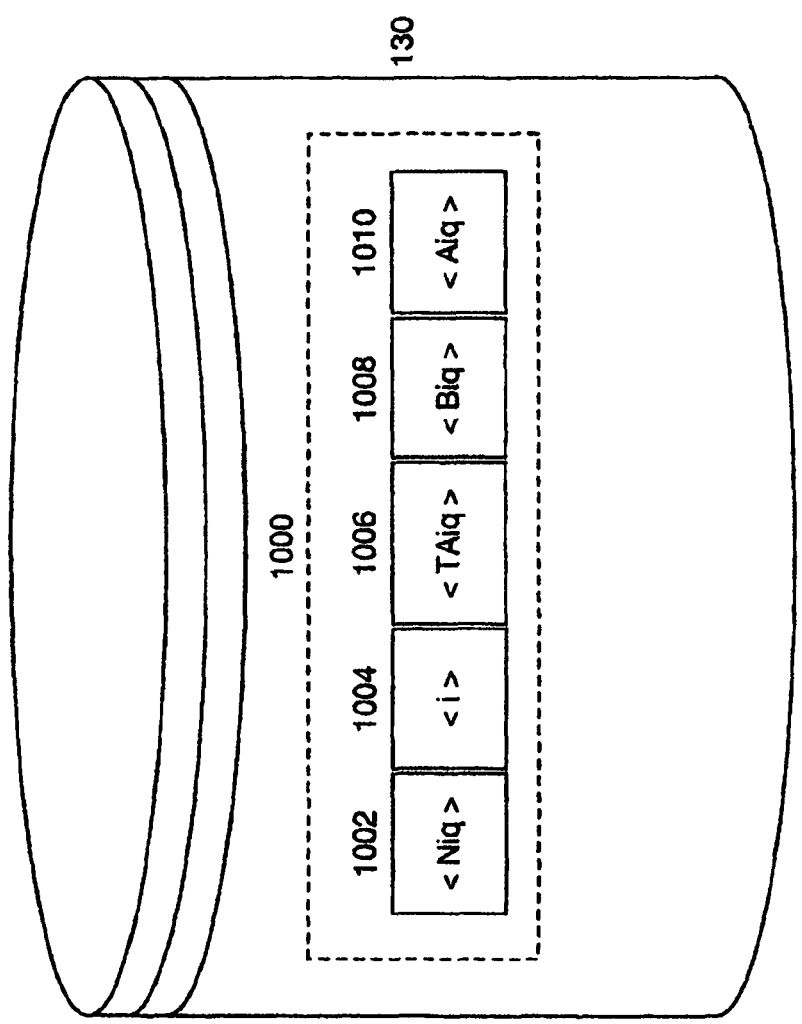
Figure 12:
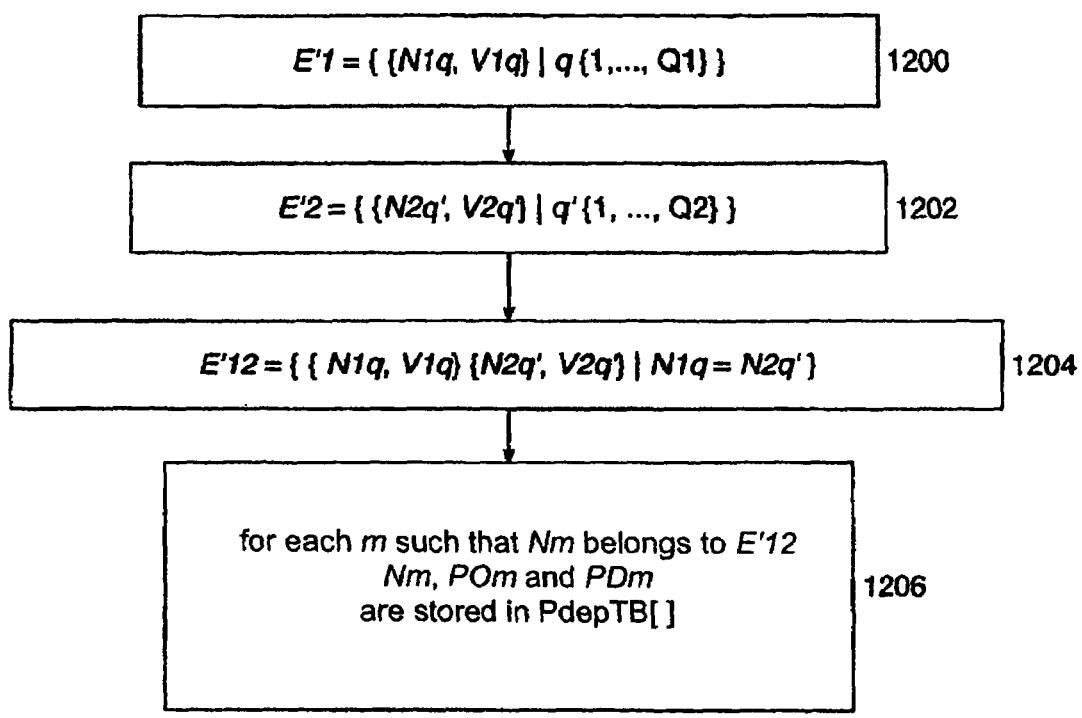
Figure 13:
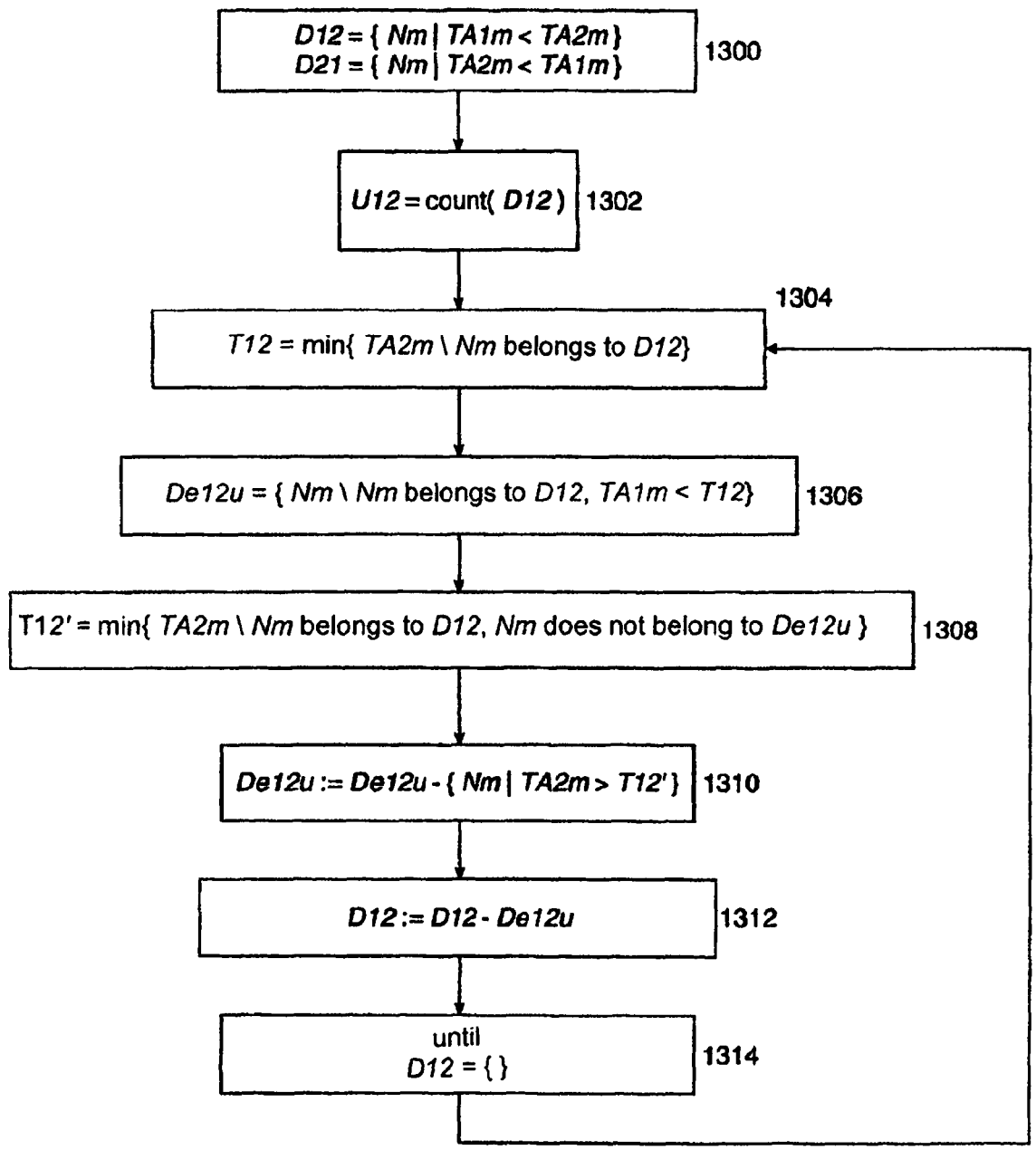
Figure 14:
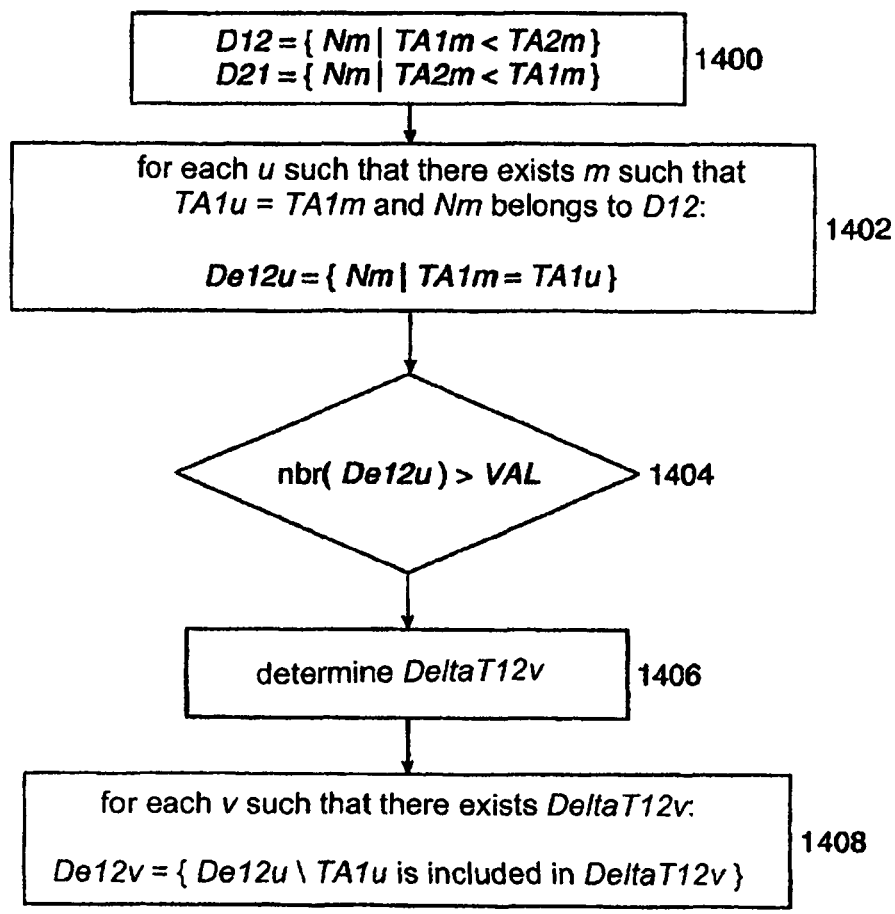
Figure 15:
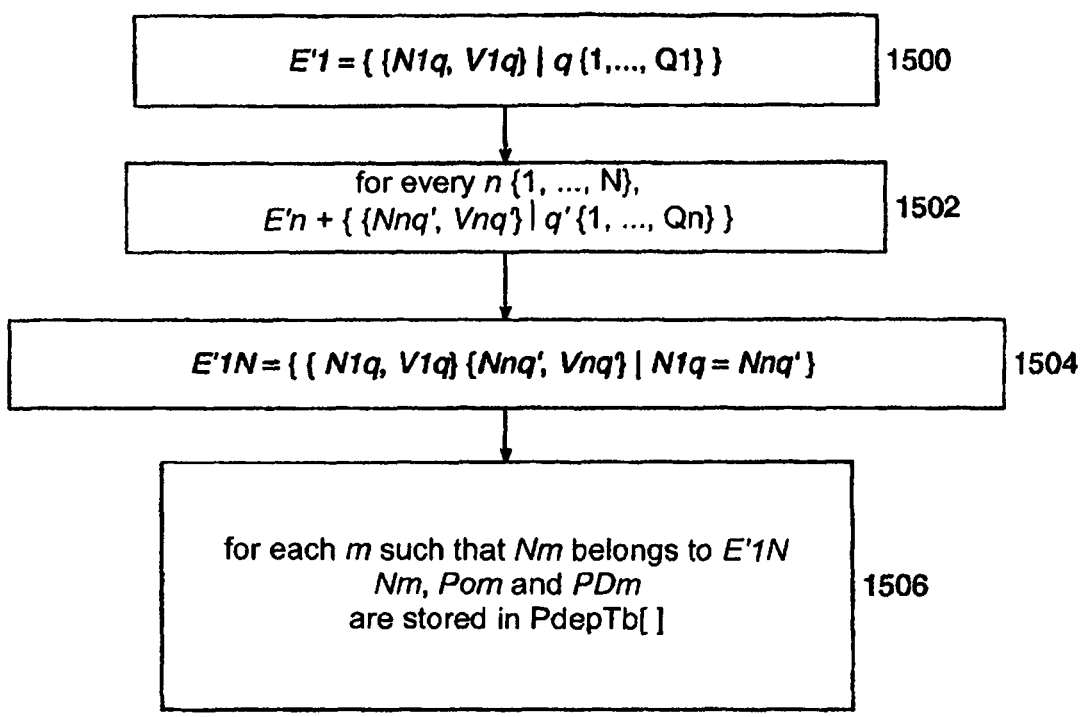

Further features and advantages of the invention will become apparent from a study of the detailed description that follows and the drawings, wherein:

FIG. 1 shows a functional diagram illustrating an embodiment of a tool according to the invention, FIG. 2 shows a flowgraph illustrating a document signature generating function for the tool according to the invention, FIG. 3 shows a table illustrating storage in the working base in FIG. 1, FIG. 4 shows a flowgraph illustrating a state signature generating function for the tool according to the invention, FIG. 5 is a flowgraph illustrating a imprint generating function for a set of documents for the tool according to the invention, FIG. 6 shows a table illustrating another part of the storage of the working base in FIG. 1, FIG. 7 shows a flowgraph illustrating a document signature generating function for the tool according to the invention, in a particular embodiment, FIG. 8 shows a flowgraph illustrating an imprint dating function in a particular embodiment;

FIG. 9 shows a flowgraph illustrating an imprint generating function in a particular embodiment, FIG. 10 shows a diagram illustrating the structure of the production database of FIG. 1 in a particular embodiment, FIG. 11 shows a table illustrating storage in the production database of FIG. 1 in a particular embodiment, FIG. 12 shows a flowgraph illustrating an imprint comparison function for the comparison module in FIG. 1 in a first embodiment, FIG. 13 shows a flowgraph illustrating a first example of an aggregating function for the comparison module in FIG. 1, FIG. 14 shows a flowgraph illustrating a second example of an aggregating function for the comparison module in FIG. 1, and FIG. 15 shows a flowgraph illustrating an imprint comparison function for the comparison module of FIG. 1 in a second embodiment.

The attached drawings may not only serve to complete the definition but may also contribute to its definition in certain cases.

As has already been seen, the expression "computer documents" is used in a fairly broad sense here. A computer document may be, fundamentally, a file of any kind, although files of a purely text type, predominantly text type or with text connotations are particularly envisaged in certain embodiments of the invention.

Specifically, a document often takes the form of a single physical computer file. However, the expression "computer document" also covers cases where a number of documents would be contained in the same physical file or, conversely, cases where a given document is made up of a number of physical computer files. The term "logic file" is often used to move away from the relationship between the document and the physical file or files which contain the document or parts thereof.

The content of the document may be "played": a text or web page may be displayed, music may be listened to, a video may be viewed or a program may be run, for example. In this case, the document is not modified in principle.

The contents of the document may also be made accessible to a person for editing, i.e. creation/amendment. Any editing, however disorganised, will be indicated by the existence of different versions of the same document.

Basically, the term "set of documents" is used here to refer to a number of versions of the same document. However, from a broader perspective, the set of documents may comprise a number of sets of versions of several documents, within the scope of a greater project.

Definitions and Conventions of Notation

The term Pi denotes a set of digital documents. For example, the set Pi may be a software project comprising a set of computer files of the type known as "sources" (i.e. containing computer code which cannot be executed directly and which are intended to be compiled into a series of executable instructions), and associated digital documents, such as text files containing a description, documentation and/or all the preparatory documents for the software. The set Pi may also be made up of files organised using a database, files of the XML type (standing for "eXtensible Markup Language") or SVG type (for "Scalable Vector Graphics").

A state j of the set Pi is defined as being all the digital documents in the set Pi in the state in which they are at a given moment, for example on a date Tij. It will be appreciated that a state j2 of the set Pi may differ from a state j1 of this set, for example by the presence of additional digital documents, the absence of certain digital documents and/or the presence of digital documents having a different content.

The state j of the set Pi is marked Sij.

In certain cases, and particularly when the set Pi contains a software project, the state Sij may be seen as being a version of the set of the documents Pi. This may be a version intended for distribution or an internal working version: for example, a state Sij of a software project may not be put into production, particularly if it does not constitute a functional state of the software.

A set Pi may be in states Sij, where j is between 1 and an integer Ji. Formally:

$$Pi=\{Sij | j \text{ belongs to } \{1,\ldots,Ji\}\}$$

Each state Sij is made up of all the digital documents that make up the set Pi on the date Tij in their particular state. The state of the document on the date Tij may possibly differ from its state on a different date.

A particular document l of the state j of the document set Pi is marked Oijl.

In other words, the particular state of a document Oijl in the general state Sij of the set Pi may be different from its state Oij'l' in a different general state Sij' of the set Pi.

The state Sij is made up of all the documents Oijl, where l is between 1 and an integer Lij. In formal terms:

$$Sij=\{Oijl | l \text{ belongs to } \{1,\ldots,Lij\}\}$$

Each state Sij may have at least one identified contributor Aij. By contributor is meant a person who has created the state Sij or participated in the creation of this state.

For the sake of clarity in the present description, the indices associated with a capital letter are sometimes shown separated from one another by a comma (","). However, this representation is only used where there is a likelihood of ambiguity and make it easier to read. For example, the state j of a set of documents i will be marked Sij. whereas the state 12 ("twelve") of a set of documents 1 ("one") will preferably be marked S1, 12.

Managing Tool According to the Invention

With reference to FIG. 1, the tool for managing digital documents 100 comprises an imprint generating module SignM 110 arranged so as to be capable of associating with a set of documents Pi a digital imprint Ei comprising a set of digital signatures characteristic of the content of said documents.

The module SignM 110 is arranged so as to be capable of interacting with a working database WDB 120. The base WDB 120 is capable of at least temporarily storing working data for the module SignM 110. It will be understood that the base WDB 120 comprises an organised data storage space which may take the form of a database on a permanent memory support (for example of the hard disk type) or else an addressable temporary memory (for example, of the RAM type).

The tool 100 further comprises a database of document sets PDB 130 capable of maintaining the data relating to different sets of documents Pi. In particular, the base PDB 130 is capable of maintaining the imprints Ei of document sets Pi. The base PDB 130 may take the form of a database organised on a permanent memory support, for example of the hard disk type.

The module SignM 110 is arranged so as to be capable of interacting with the base PDB 130, in particular in order to stock the imprints Ei generated by the module SignM 110.

The tool 100 further comprises a module for comparing document sets ComM 140 arranged so as to be capable of identifying the signatures common to different document sets Pi. If necessary the module ComM 140 is capable of determining a dependency between these sets of documents.

The module ComM 140 is capable of interacting with the base PDB 130 so as to extract from the base PDB the imprints Ei generated from sets of documents Pi which are to be compared, as well as data associated with these imprints, if applicable.

Finally, the tool 100 comprises a rights management module RightsM 150 arranged so as to be capable of interacting with the base PDB 130 and the module ComM 140 in order to establish the data which are useful for determining rights to the documents.

Imprint Generating Module

The module SignM 110 comprises a document imprint generating function signO( ) capable of establishing a digital document imprint Eijl characteristic of the content of a document Oijl. A digital document imprint Eijl comprises a set of digital signatures generated according to the content of the document Oijl.

The function signO( ) is described in general terms with reference to FIGS. 2 and 3.

The function signO( ) is arranged so as to be capable of breaking a document Oijl down into document elements Cijlk according to a selected rule (step 200). The function signO( ) is moreover arranged so as to establish for each element Cijlk a digital signature value Nijlk characteristic of the content of this element (step 202). This may be done by calling up a signature function sign( ). The function signO( ) is also arranged so as to associate the signature Nijlk characteristic of an element Cijlk and a reference to this element to form an element imprint Eijlk (step 204). The reference to the element Cijlk may include the value of the indices i, j, l and k. Each element imprint Eijlk may be stored in an element imprint table SignETab[ ] maintaining a correlation between a reference to the element Cijlk and the value of the signature Nijlk.

Optionally, an element attribute AEijlk may be associated with each element Cijlk. The element attribute AEijlk may be stored in the table SignETab[ ]. An element attribute AEijlk may include the value of a number of lines of code, for example if the element is a function and the object is a source file. The element attribute AEijlk may also include the value of an index of relevance of the content of the element Cijlk. One or more additional element attributes may be stored in the table SignETab[ ].

The table 300 in FIG. 3 shows an embodiment of a table SignETab[ ] for the element C1,1,2,2.

The imprint Eijl characteristic of the contents of the document Oijl comprises the set of element imprints Eijlk, where k is a natural integer varying between 1 and a natural integer Kijl (step 206). If appropriate, the imprint Eijl further comprises the set of element attributes AEijlk associated with the elements Cijlk of the element imprints Eijlk.

The base WDB 120 at least temporarily stores the imprint Eijl, in relation to a time reference Tpijl of the document Oijl. For example, the time reference Tpijl may comprise the date Tij associated with the state Sij. The time reference Tpijl could equally comprise a date Tijl associated with the document Oijl, for example a date on which the document was last amended.

The base WDB 120 may hold a correlation, for example in a document imprint table SignOTab[ ], of the following:
  a document identifier Oijl, for example an identifier made up of the value of the indices i, j and l,
  a reference to each of the element imprints Eijlk of the document Oijl, for example a reference made up of the indices i, j, l and k, and
  the value of the time reference TPijl of the document Oijl, for example the date Tij.

Optionally, a document attribute AOijl may be associated with each document Oijl. The document attribute AOijl may be stored in the table SignOTab[ ]. A document attribute AOijl may comprise the value of a size of a computer file, the identity of a contributor Aij or a note qualifying a level of confidence in the time reference TPijl. One or more additional document attributes may be stored in the table SignOTab[ ], for example so as to be able to associate a document Oijl both with a contributor identity Aij and with an index of confidence in the time reference TPijl.

The structure of the tables described here is intended primarily to enable the invention to be understood. Other structures of the table SignOTab[ ] may thus be envisaged in practice. For example, the table SignOTab[ ] may contain an imprint identifier Eijl and this identifier may be linked to the document Oijl. The table SignOTab[ ] may also include the value of the signature Nijlk of each of the element imprints Eijlk of the document in question, or all the element imprints Eijlk instead of or in addition to references to these imprints. For example, one embodiment of the invention might consist in drawing up, for a particular document Oijl, a table in which each row contains an identifier of a document element Cijlk (for example the value of the indices i, j, l and k), the value of the signature Nijlk of this element, the value of the time reference Tpijl of the document and, if applicable, the value of the document attribute A Oijl of the document Oijl and the value of the element attribute AEijlk of the element, this table being filled so as to cover all the. elements Cijlk of the document Oijl.

In FIG. 3, table 304, made up of columns COL301 to COL308 and rows ROW310 to ROW3 13, illustrates such an embodiment for an object O1, 1, L11. In this table 304, a contributor identifier A11 is stored as a document attribute AO1, 1, L11 (COL308) and the date T11 is stored as a time reference TP1, 1, L11 (COL307).

The module SignM 110 also comprises a state imprint generating function SignS( ) arranged so as to be capable of establishing a state imprint Eij characteristic of the state Sij of a set Pi.

The function signS( ) is described by means of FIG. 4.

A state Sij comprises a set of documents Oijl at a moment Tij, where l is a natural integer varying between 1 and a natural integer Lij (step 400). The function signs( ) is arranged so as to call up successively the function signO( ) for each of the documents Oijl of the state Sij in order to obtain, for each document Oijl, a document imprint Eijl comprising a set of element imprints Eijlk (step 402).

The state imprint Eij comprises all the element imprints Eijlk, where k varies between 1 and Kijl and l varies between 1 and Lij (step 404).

The base WDB 120 stores the imprint Eij at least temporarily.

The base WDB 120 may hold in correlation, for example in a state imprint table SignSTab[ ]:
  a state imprint identifier Eij, for example an identifier made up of the value of the indices i and j, and
  a reference to each of the document imprints Eijl of the state Sij, for example made up of the indices i, j and l.

As explained previously, the structure of the table SignSTab[ ] may be different in practice. For example, one embodiment of the invention may consist in drawing up a table which collects all the document imprints Eijl, for example in the practical embodiment described previously, of the documents of the state Sij. In FIG. 3, table 306 made up of columns COL301 to COL308 and rows ROW314 to ROW326, illustrates this embodiment for the state S1, 2.

Optionally, a state attribute ASij may be associated with each state Sij. This attribute ASij may be stored in the table SignSTab[ ]. For example, the state attribute ASij might comprise an index, or mark, qualifying the reliability of the date Tij, and/or an index qualifying the reliability of the identity of the contributor Aij (for example, a minimum index value for identification using a connection name or "login", and a maximum index value for identification by means of an authentication procedure certified by a third party).

The module SignM 110 also comprises an imprint generating function for the set of documents signP( ) arranged so as to be able to establish a document set imprint Ei characteristic of the set Pi.

The function signP( ) is described by means of FIG. 5.

The set of documents Pi comprises a number of states Sij, where j is a natural integer varying from 1 to a natural integer Ji (step 500). The function signP( ) is arranged so as to call up, successively, for each state Sij of the set Pi the function signS( ) in order to obtain for each state Sij a state imprint Eij comprising a number of element imprints Eijlk, where k varies between 1 and Kijl and l varies between 1 and Lij (step 502).

A document set imprint Ei comprises all the element imprints Eijlk, where k varies from 1 to Kijl, l varies from 1 to Lij and j varies from 1 to Ji (step 504).

The base WDB 120 stores the imprint Ei, at least temporarily.

The base WDB 120 may hold in correlation, for example in a document set imprint table SignPTab[ ]:
  an identifier of the document set imprint Ei, for example an identifier made up of the value of the index i, and
  a reference to each of the state imprints Eij, for example made up of the indices i and j.

As explained previously, the structure of the table SignPTab[ ] may be different in practice. One embodiment of the invention may consist in drawing up a table that combines all the state imprints Eij of the set of documents Pi, for example in the practical embodiment described previously. In FIG. 3, the table 308, consisting of the columns COL301 to COL308 and rows ROW301 to ROW339, illustrates such an embodiment for the document set P1. In this table 308, each row contains:
  a reference to a document element consisting of a column COL301 storing the value of the index i, a column COL302 storing the value of the index j, a column COL303 storing the value of the index l, and a column COL304 storing the value of the index k, and the value of the signature of this document element in a column COL305, the value of the attribute of this element in a column COL306, the value of the time reference of the document from which this element has originated in a column COL307, and the value of the attribute of the document from which this element has originated in a column COL308.

The module SignM 110 comprises a signature dating function signTp( ) arranged so as to be able to associate a signature datum Viq with each different signature value Niq of a set Pi the imprint of which is stored in the base WDB 120, as a function of the time references TPijl of the documents Oijl with which said signature is associated in the base WDB 120.

The function signTp( ) is described with reference to FIG. 6.

The function signTp( ) is arranged so as to establish, for a particular signature value Niq of the base WDB 120, all the element imprints Eijlk containing this signature value and, on each occasion, the time reference TPijl of the document imprint Eijl in relation to the element imprint Eijlk in the base WDB 120.

The function signTp( ) is furthermore arranged so as to hold in correlation, for this signature value Niq, for example in a signature table SignTb[ ]:

an identifier of an element imprint Eijlk containing said particular signature, for example comprising the values i, j, l, and k, and the time reference TPijl, for example the date Tij, of the document imprint Eijl in relation to the element imprint Eijlk in the base WDB 120;

the function SignTp( ) being arranged so as to fill the table SignTb[ ] such that it contains an identifier for each element imprint Eijlk stored in the base WDB 120 in which this signature value is found.

In FIG. 6, table 600 shows an embodiment of the table SignTb[ ] for a signature value Nia. This table 600 contains n rows, represented by the rows ROW601 to ROW604, where n is the number of element imprints Eijlk comprising the signature value Nia. The quadruplets {i, ja1, la1, ka1}, {i, ja2, la2, ka2} to {i, jan, lan, kan}, each represent an identifier of an element imprint containing the signature value Nia. These quadruplets are stored in columns COL602 to COL605 of the table 600. Column COL606 of table 600 stores, as time references, the dates Ti,ja1 to Ti,jan, in rows ROW601 to ROW604.

The table SignTb[ ] may be stored, at least temporarily, for example in the base WDB 120.

The function signTp( ) is repeated so as to create a table SignTb[ ] for each of the different signature values Niq existing in the document imprints Eijl stored in the base WDB 120.

If desired, the signature table SignTb[ ] may further comprise, for each element imprint Ni,jqp,lqp, kqp whose signature is equivalent to Niq, the attribute value of this element AEi,jqp,lqp,kqp and the attribute value of the document AOi, jqp,lqp comprising this element.

The function signTp( ) is moreover arranged so as to assign to each table SignTb[ ] stored in the base WDB120, and relating to a particular signature value Niq, at least one signature datum Viq.

The signature datum Viq may be obtained by applying a predetermined date function dat( ) which uses the time references of the table SignTb[ ]. In other words, the signature datum Viq associated with the table SignTb[ ] may be a function of the timer references TPijl, for example the dates Tij, associated with the imprint identifiers Eijl of this table. For example, the signature datum Viq may be the oldest date Tij contained in the table SignTb[ ].

When the signature table SignTB[ ] stores document attribute values AOi,jqp,lqp the function dat( ) may be arranged so as to determine the signature datum Viq as a function, moreover, of these attribute values. For example, when the attribute values AOi,jqp,lqp comprise a reliability index for the time reference TPi,jqp,lqp, the function dat( ) may be arranged so as to determine the oldest date Ti,jqp of the table SignTb[ ], while excluding, for this determination, the dates Tijqp associated in the table SignTb[ ] with a document attribute value AOi,jqp,lqp which is below a threshold value.

The function signTp( ) may also be arranged so as to assign to each table SignTb[ ] stored in the base WDB 120, and relating to a particular signature value Niq, a document datum Wiq. The document datum Wiq may be obtained by applying a predetermined authentication function aut( ) which uses the document attributes AOi,jqp,lqp of the table SignTb[ ]. In addition, the function aut( ) may use the signature data Viq, and/or the time references TPi,jqp,lqp as well. For example, the function aut( ) may be arranged so as to determine, as the Wiq datum, the value of the document attribute AOi,jqp,lqp having the oldest associated time reference TPi,jqp,lqp. If the time reference TPi,jqp,lqp comprises a date Ti,jqp and the document datum comprises a contributor identifier Ai,jqp, a function aut( ) of this kind may be arranged so as to establish, as the document datum Wiq, the identifier of the oldest contributor associated with the particular signature value Niq.

In practice, one embodiment may consist in constructing, for a particular signature value Niq, a table, such as the table 602 in FIG. 6, in which each row contains:

one column storing the value of said signature Niq (COL601), columns storing the values i, jqp, lqp and kqp of the indices of the document element the content of which has generated the signature value Niq (COL602 to COL605), the time reference TPi,jqp,lqp, in this case the date Ti,jqp, of the document from which said document element has originated COL606), the value of the signature datum Viq (COL609), and, if applicable, the value of the attribute of said element AEiqp,jqp,lqp,kqp (COL607), the value of the attribute of the document from which said document element AOi,jqp,lqp has originated (COL608), the value of the document datum Wiq (COL610);

this table is filled so as to store all the element imprints containing the signature value Niq, i.e. in this case, the r imprints Ei,jq1,lq1,kq1 to Eijqr,lqr,kqr.

Optionally, the function signTp( ) may also be arranged so as to establish, for each signature value Niq, an element datum Ziq (not shown in FIG. 6) as a function of the values of the element attributes AEi,jqp,lqp,kqp associated with this signature value Niq. For example, the element datum Ziq may comprise the maximum value of the element attribute values AEi,jqp,lqp,kqp.

The function signTp( ) is also arranged so as to be capable of collecting the signature data Viq of the signature tables SignTb[ ]. For example, the function signTp( ) is arranged so as to construct a table of timed document set imprints TempSignPTb[ ] which store, in mutual relationship:

an identifier of the set of documents Pi, for example the index i each different signature value Niq the signature datum Viq associated with said signature value Niq.

In the example shown in FIG. 6, this comes down to arranging the function signTp( ) so as to extract the signature datum Viq, and the value of the index i from any row containing the signature value Niq, for each signature value Niq. In FIG. 6, for example, a table TempSignPTb[ ] could be formed by the intersection of the columns COL601, COL602 and COL609 with the rows ROW601, ROW605 and ROW609.

This therefore results in particularly light storage of the document set imprint. If the time reference comprises the date Tij and where the function dat( ) is arranged so as to determine, as the datum Viq, the oldest of the dates Tij, this datum is equivalent to the date of the first appearance of the signature value in the document set Pi. The imprint of the document set is thus made up of the set of signatures and their date of first appearance. Other information may be stored as a function of the dat( ) function as will be explained below.

If applicable, the dat( ) function may take into account the document data Wiq and the element data Ziq.

In another embodiment, the table TempSignPTb[ ] may also hold a reference to each element imprint Eijlk, for example containing the values of the indices i, j, k and l. This makes it possible to maintain, in the base WDB 120, a link between a reference to a document element and the corresponding signature datum.

In yet another embodiment, the table TempSignPTb[ ] may also hold a reference to each element imprint Eijlk, for example comprising the values of the indices i, j, k and l, and a reference to the document Oijl, for example containing the indices i, j and l. Thus, for a particular document Oijl, it will be possible to establish the signature data Viq of the document elements Cijlk corresponding to this document. When the datum Viq is established as being the oldest date Tij, it is possible to determine the date of first appearance of a document element Cijlk in the set Pi, independently of the document Oijl in which it appeared for the first time. Thus, it is possible to identify the elements of a document produced before the creation of this document within a document set.

A practical embodiment of the table TempSignPTb[ ] may consist in drawing up a table such as, for example, table 604 in FIG. 6, in which each row contains:

one column storing a signature value Niq (COL601);

a reference to a document element Ci,jqp,lqp,kqp from which this signature value Niq has originated, in this case in the form of the values of the indices i, j, l and k (COL602 to COL605), the time reference TPi,jqp,lqp of the document Oi,jqp,lqp from which this document element Ci,jqp,lqp,kqp has originated (COL606), in this case the date Tiqp,jqp, the value of the signature datum Viq (COL609), and, if applicable the value of the attribute AEi,jqp,lqp,kqp of the element Ci,jqp,lqp,kqp (COL607), the value of the attribute AOi,jqp,lqp of the document Oi,jqp,lqp from which the document element Ci,jqp,lqp,kqp has originated (COL608), the value of the document datum Wiq (COL610);

said table being filled so as to bring together all the signature values Niq of the document set Pi. In other words, the embodiment described here consists in combining, in the same table, the tables of the same type as table 602 drawn up for each of the signature values Niq of the document set Pi.

The module SignM 110 and in particular the function signTp( ), is capable of interacting with the base PDB 130 so as to store the results of the compilation of the signature data in the signature tables.

For example, the base PDB 130 may thus hold a datum relating to the period of existence of a signature value in the document set Pi.

In a particular embodiment, the document imprint Eijl may be reduced so as to limit the size of the database or to assist with a subsequent signature search. For example, the references to some of the element imprints (and the element imprints themselves) may be deleted as a function of the values of the time references, the element attribute data and/or the document attribute data.

Document Imprint Generating Function

The function signO( ) is described in detail in a particular embodiment with reference to FIG. 7.

A document Oijl will be considered, i.e. a particular document l of the state Sij of a document set Pi (step 700).

The function signO( ) is designed so as to call up a function type( ), which is itself arranged so as to be capable of establishing a datum characteristic of the computer nature of the document Oijl (step 702).

By the term "computer nature" is meant here the computer structure of the document Oijl in the sense that this structure is common to all documents of the same type. The computer nature or type may be widespread or may be the subject of standards such as for example "text" type files, "Microsoft Word" type files (registered trademark), "image" type files of a particular format. The type may also be specific to software which has generated the document.

The characterisation of the type of document Oijl, in the particular case where it is a file, may be carried out by recognising the file name extension, for example when the document is a file created in a "Microsoft Windows" (registered trademark) environment.

Characterisation may also be carried out by recognising in the file sequences of bits characteristic of a type of file. In particular, the recognition of characteristic keywords in source files may make it possible to identify a programming language. Thus, the function type( ) is also capable of determining the language used for a source type file.

The function signO( ) is designed so as to call up a content filter function filterA( ) which is itself designed so as to be capable of producing, from the document Oijl and the type of this document, a document with a cleaned-up content O'ijl (step 704).

For example, the function filterA( ) may be arranged so as to delete any comments inserted in a source file, characters which are foreign to the semantics of the programming language, or characters which are dependent on a particular operating system.

The function filterA( ) is configured so as to improve the robustness of the function signO( ) and consequently the relevance of the imprint generated by this function. By robustness is meant here the capacity of the function signO( ) to generate an identical document imprint in spite of the addition of amendments which are deemed insignificant for the content. Amendments which may be regarded as insignificant are, for example:

amendments relating only to the formatting of a document, for example of the text type, these amendments possibly having been carried out automatically (for example, the addition of consecutive space characters or a blank line), and the rewriting of a content, such as for example changing names of functions or variables or deleting or adding a mention of copyright.

It will be noted that the rewriting of a content could be legitimate or benevolent, for example when it sets out to bring the content of the document into conformity with certain formal rules or naming conventions. Rewriting could equally be malevolent or illicit, particularly when it is carried out with the sole aim of assuming authorship or concealing the reuse of a content.

It will be understood that the clean-up of the document Oijl is a function of the type of document.

The function signO( ) is arranged so as to call up a content extracting function cut( ) capable of isolating, in a document O'ijl, document elements Cijlk such as functions or procedures in a source code type document, for example. This locating of individual elements is a function of the type of document Oijl. (step 706)

The function cut( ) is arranged so as to establish from the document O'ijl a set of elements Cijlk, where k is a natural integer between 1 and an integer Kijl. For example, the function cut( ) may be arranged so as to be capable of extracting from a document O'ijl which is a source of a specified programming language, a set of functions contained in this object.

The function signO( ) is designed so as to call up a content filter function filterB( ) designed to be capable of producing, from an element Cijlk, and from the type of document Oijl, a cleaned up element C'ijlk. (step 708)

In a similar manner to the function filterA( ), the function filterB( ) may, for example, be arranged so as to delete comments and characters which are foreign to the semantics of the programming language identified, and/or to suppress characters which are dependent on an operating system. The function filterB( ) sets out to improve the robustness of the module SignM 100, in the sense described previously.

The function filterB( ) results in a set of cleaned up elements C'ijlk, where k is a natural integer between and 1 and an integer Kijl.

The function signO( ) is moreover arranged so as to call up a signature generating function sign( ) designed so as to be capable of establishing from a cleaned up element C'ijlk a signature Nijlk which is characteristic of the content of this document element. (step 710)

The signature Nijlk may take the form of a string of characters of a specified length, for example a string of ASCII or hexadecimal characters. Preferably, the function sign( ) comprises a signature generating algorithm known as "hash". The signature Nijlk is unique to the content of a given element C'ijlk. In every case, the function sign( ) is preferably determined so as to have a strong probability of non-occurrence, i.e. so that the probability that the same signature would be obtained from different contents of elements C'ijlk is as low as possible. Moreover, the function sign( ) is chosen to be non-reversible, i.e. arranged so that in practice it is impossible to establish the content of the element from its signature : among other things, this allows long term storage of signatures without any concerns as to confidentiality, as the explicit content of the documents is neither stored nor disclosed.

It will be noted here that the use of a string of characters of a specified length as a signature for the content of a document makes document comparison easy because it is simpler to compare computer objects of constant size than to compare objects of different sizes, which are more bulky. Moreover, these strings of characters make it possible to compare document sets and may be widely distributed as they do not disclose their contents.

The signature generating algorithm or "hash" algorithm may be of the MD5 type (standing for "Message Digest 5") or SHA-1 (standing for "Secure Hash Algorithm"), for example.

The function sign( ) is called up for each element C'ijlk so as to obtain a set of signatures Nijlk, where k is a natural integer varying between 1 and Kijl, from a document Oijl.

Preferably, the function signO( ) is arranged so as to call up a scoring function eval( ), which is itself arranged so as to be capable of associating, with a signature Nijlk, a signature relevance datum Bijlk as an element attribute AEijlk. (step 712)

By relevance is meant here an assessment of the interest of a document element with regard to a contribution or an amendment made to the document. The function eval( ) may be arranged so as to take account of one or more criteria selected from among:

the size of the document element, for example a number of lines of code, or characters, in the case of a source file function;

the presence of the signature in a list of signatures associated with a low relevance index, this list possibly being specific to one type of document;

the number of contributors to this document and/or the activity in terms of contributions to the document.

Obviously, this list is not exhaustive and the function eval( ) may take account of other criteria.

Each cleaned up element C'ijkl may be regarded as being "atomic" in the sense that there is no value in breaking it down any further as it would then lose those aspects associated with its very nature (properties and meaning, in particular). Thus, its signature Nijlk could be looked at as an "atomic imprint", as opposed to the (global) imprint Eijl of the document.

The function signO( ) is also arranged so as to associate each signature Nijlk with a document reference Oijl, for example containing the indices i, j, l in an element imprint Eijlk. (step 714)

The function signO( ) makes it possible to obtain a document imprint Eijl which is characteristic of the object Oijl comprising a set of element imprints Eijlk, where k varies between 1 and Kijl. (step 716)

The document imprint Eijl may be stored in the base WDB 120 as explained previously.

It will be understood that the time reference may be the date Tij of the state Sij. The time reference could equally be given by the index j on its own, where the j's are in chronological order.

In a particular embodiment, the document imprint Eijl also comprises a contributor identifier Aij as a document attribute AOijl which has created the state Sij or participated in the creation of this state, as a document datum.

It has been seen that the functions filterA( ) and filterB( ) are arranged so as to prevent a document element from generating a distinct signature after insignificant amendments to its content. However, these functions may also be designed so that the imprint of a particular document, the content of which has been amended in an insignificant manner, differs partially from its original imprint, with the aim of tracking such amendments. This may be carried out by adapting the functions filterA( ), filterB( ) and cut( )relative to one another, for example so as to cut a content of elements the signature of which should or should not change and to adapt the function filterB( ) in order to do so.

For example, most frequently, simply changing the names of variables within a function of a document is regarded as a simple content rewrite. The functions filterA( ), filterB( ) and cut( ) may be designed so as to obtain a document imprint containing certain identical signatures relating to the content of this function and other different signatures, so as to indicate that a rewrite has taken place. For example, when the rewrite relates only to the change of the name of a function, the functions filterA( ), filterB( ) and cut( ) may for example be arranged so that the function of the document is broken down into a first document element corresponding to the declarative part of this function and a second document element corresponding to the body, or content, of the function, and so that the signature of the first element changes while that of the second remains unchanged.

The functions filterA( ), filterB( ) and cut( ) may in some cases be arranged so as to preserve an identical document, particularly as a function of the type of document.

It will be understood that the function signO( ) has to be robust to allow a later comparison of imprints. To enable two imprints to be compared, (i.e. in order to search for common signatures), the same document necessarily has to generate the same imprint whatever the module SignM 110 used. The functions cut( ), filterA( ) and filterB( ) thus have the primary purpose of being disclosed and standardised if it is desired to use different imprint generating tools. However, this disclosure favours the implementation of strategies intended to catch out the robustness of these filters, particularly with regard to rewrites, in the case of a malevolent content rewrite, in particular.

In one particular embodiment of the function signO( ), a verification function ver( ) may be called up prior to step 706 so as to ensure that the source code confirms to certain formal rules, possibly depending on the programming language. For example, when the document Oijl is a source file, the verification function ver( ) may comprise a grammatical analyser of the source code capable of establishing an abstract representation of the source code in accordance with the rules of syntax and grammar of the language. This grammatical analyser may itself be unsusceptible to the insignificant amendments or content rewrite. For example, the function ver( ) may be designed so as to establish an abstract syntax tree or "AST". By doing this, the function signO( ) is more robust in the sense described previously.

Signature Dating Function

In a particular embodiment, the function dat( ) is designed to establish as signature datum Viq a period of existence of the signature Niq under consideration.

In this embodiment, the signature datum Viq may comprise a date of appearance TAiq, or of first presence, of the signature value Niq in the document set Pi and a date of disappearance TDiq, or date of last presence. In this case, the function dat( ) may be arranged so as to establish the oldest of the time references, for example the oldest of the dates Ti,jq, in the table signTb[ ], as the appearance date TAiq, and the most recent of these dates as the disappearance date TDiq.

In an alternative embodiment, the function dat( ) is designed so as to establish, as the signature datum Viq, a set of periods of existence. The function dat( ) may be arranged so as to interact with the base WDB 120 so as to extract from this base a table of states STb[ ] each bringing together different dates Tij present in the imprint Ei of the document set Pi. The function dat( ) may be arranged so as to compare each of the dates Ti,jqp of the table SignTb[ ] with the dates combined in table STb[ ] so as to determine the dates Tij with which the signature in question is, or possibly is not, associated.

Instead of the date Tij, the function dat( ) may be arranged so as to work on version identifiers, for example the different values of the index j.

In another embodiment the states Sij are arranged in order, i.e. the superiority of an index j' over an index j implies that the date Tij' is more recent than the date Tij.

The function dat( ) can then be arranged so as to establish the dates TAiq and TDiq differently. The function dat( ) is described with the aid of FIG. 8, in this particular embodiment.

The function Dat( ) is arranged so as to be able to compare the state Sij, characterised by its state imprint Eij made up of the set of element imprints Eijlk (step 800) with all the earlier states Sij' characterised by the set of signature values Niq' associated with these earlier states, i.e. for which there is a quadruplet i, j', l' and k', such that the signature value Nij'l'k' is equivalent to Niq' (step 802). For each of the signature values Niq of the state Sij, i.e. for every integer q where there is a quadruplet i, j, l and k, such that Nijlk is equivalent to Niq (step 804) the function dat( ) checks whether there is a signature value Niq' associated with a state Sij' in the base WDB 120 (step 806).

If the answer is yes (step 808), then the signature value Niq existed in an earlier state j' of the document set Pi. The date of appearance TAiq' of the signature value Niq' in the document set Pi remains unchanged. The date of disappearance TDiq' of the signature value Niq' in the document set Pi receives the date Tij of the state Sij.

If the answer is no (step 810), the signature value Niq is new in the document set Pi. The dates of appearance TAiq and disappearance TDiq both assume the value of the date Tij of the state Sij.

In this embodiment, the timed imprint of the document set can be quickly updated when an imprint of a subsequent state Eij, for example of the last known state, is added. This particular embodiment makes it possible to construct the timed imprint of a document set by successive additions of its successive state imprints. By updating is meant here the addition of the signature values which did not exist in the previous state and the calculation of the signature data Viq which are modified by the addition of the new state.

In other words, the function dat( ) may be arranged so as to compare a state Sij the imprint Eij of which is stored in the base WDB 120 and a set of earlier states Sij', where j' is a natural integer less than j, the imprints Eij' of which are stored in the base PDB 130, in order to update the timed imprint of the document set Pi.

Particular Embodiment of the Imprint Generating Module

In a particular embodiment, the module SignM 110 is designed so as to interact with a version management tool, for example of the CVS type or equivalent.

Version management tools are capable of organising the storage of document sets and their different states. In particular, the version management tools are able to manage the different states of a document set in an incremental and coherent manner: the use of a version management tool makes it possible to obtain the scheduling of the states Sij described previously.

When a number of contributors are capable of simultaneously amending the same document set, a version management tool makes it possible to identify the state from which the amendments have been made by the contributor. Certain version management tools only store the successive amendments and/or are capable of checking, if necessary, the absence of conflict between simultaneous amendments made to all or part of the same document. A version management tool can also ensure that the updating is necessarily carried out relative to the last known version rather than in relation to the original version when it is known. In practice, the different version management tools operate in different ways: here, the coherence between the states Sij arising from the use of the version management tools is used to improve the timed imprint generating process.

The version management tool also supplies an identifier of the contributor who has carried out the update, and/or a list of the documents modified since a particular state.

For example, a tool of the CVS type can store the last state of a document Oijl and the differences between the different earlier states of successive documents Oiml, where m is a natural integer less than j. Here, the index l is associated independently of the state index j with a file which is uniquely characterised by its name and filepath.

The version management tool also provides an updating date, for example on the central server. This date is stored as a time reference for the state of the document set.

A state may correspond to an updating of the version which is present on the server. Thus, typically, a contributor is associated with a state.

It will be noted here that depending on the version tool used, or according to the use that is made of it, it is possible to assign:
- either a new state as soon as a document in a document set is modified;
- or a new state for a modification of a number of documents in the course of the same contribution.

This only slightly changes the operation of the tool 100, particularly by increasing or decreasing the number of states.

In this embodiment, the module SignM 110 may include a version comparison function compS( ).

The function compS( ) is described with the aid of FIG. 9.

To simplify the description it is assumed here that two states Sij' and Sij are successive.

Here, the tool is of the CVS type. In this case, the index l characterises the document independently of the state.

For each document Oijl in the document set Pi in a state Sij, the function compS( ) is designed so as to determine whether there is a document Oij'l in the set of documents Pi in an earlier state Sij'. (step 900)

If the answer is no, the function compS( ) is designed to call up the function signO( ) described previously in order to generate all the element imprints Eijlk for the document Oijl. (step 902)

Each element imprint Eijlk, and particularly the signature Nijlk which it contains, is stored in the base WDB 120 as described previously. A time reference TPijl of the document Oijl, for example the date Tij of the update (or contribution) obtained using the version management tool, is also stored in the base WDB 120. Preferably, a document attribute AOijl, for example an identifier of the contributor Aij of the state Sij, is also stored in the base WDB 120 (step 904). If desired, the document attribute AOijl could include an identifier for each contributor Aij in the state Sij.

If the test in step 900 is positive, then the function compS( ) is designed so as to check whether the document Oijl is identical to the document Oij'l (step 906). This can be done by comparing the states. In certain cases, the version management tool is capable of carrying out this check.

If the answer is yes, the function compS( ) is designed so as to associate each signature of the element imprints Eij'lk' with the document Oijl. In other words, the function compS( ) establishes the imprint Eij'l of the document Oij'l as the imprint Eijl of the document Oijl, with the exception of the time reference TPijl which is that of the document Oijl. (step 908)

In this embodiment it is not necessary for the function compS( ) to be designed to generate all the element imprints Eijlk of the document Oijl. The function compS( ) can use the element imprints Eij'lk' of the document Oij'l. The use of a version management tool interacting with the module SignM 110 makes it possible to save on material resources, particularly the processor unit load.

If the test in step 906 is positive, the documents Oijl and Oij'l are different. The document Oijl can then be seen as a transformation of the object Oij'l that took place on the date Tij and had the contributor Aij (step 910). In FIG. 9, this transformation is shown in the form of a function hijl( ).

The function compS( ) is designed to call up the function signO( ) so as to generate all the element imprints Eijlk of the document Oijl as described previously (step 912). The element imprints Eijlk are stored in the base WDB 120, if necessary in correspondence with a time reference TPijl (for example the date Tij) and a document attribute AOijl (for example a contributor identifier datum (Aij).

Structure of the Document Set Database

An example of the structure of the PDB base 130 is shown in FIG. 10.

For each set of documents Pi, the base PDB 130 may be designed so as to maintain a timed imprint table of the document set TpSignPTb[ ] 1000.

Each row in this table TpSignPTb[ ] 1000 may include:
- a signature column 1002 storing a particular signature value Niq of the document set Pi, distinct from the signature value of another row,
- a column of reference to the document set 1004, for example storing the value of the index i, and
- a signature datum column 1006 storing the signature datum Viq associated with the value of the signature datum Niq, for example in this case the date TAiq of appearance of the signature value Niq in the document set Pi.

If desired, each row in this table TpSignPTb[ ] 1000 may also include:
- a column for the element attribute datum 1008 storing the element datum Ziq, for example in this case the value of a relevance index Biq,
- a document datum column 1010 storing a document datum Wiq, for example in this case a contributor identifier Aiq.

Each row in the table TpSignPTb[ ] 1000 may be regarded as a timed element imprint Eiq.

The table TpSignPTb[ ] 1000 may also include other data, in particular data established by the module SigrnM 110 and/or temporarily stored in the base WDB 120.

A particular embodiment may consist in storing the table in FIG. 6 as the table TpSignPTb[ ] 1000 for a particular document set.

The base PDB 130 can then be arranged so as to store such a table for each document set Pi or in order to combine the tables relating to the different document sets Pi in one table. In FIG. 11, for example, table 1100 combines a table 1102 analogous to the table 604 for a document set P1 consisting of columns COL1101 to COL1110 and rows ROW1101 to ROW1113, a table 1104 analogous to table 604 for a document set P2 consisting of columns COL1101 to COL1110 and rows ROW1114 to ROW1126, as well as a table 1106 analogous to the table 604 for any document set Pi consisting of columns COL1101 to COL1110 and rows ROW1128 to ROW1140.

First Embodiment of the Module for Comparing Document Sets

The tool according to the invention comprises a document set comparison module ComM 140 designed so as to produce a set of signature values associated in the base PDB 130 both with a set of documents Pi and with a different set of documents Pi'. This may make it possible to determine that document elements Oijl of the document set Pi are found in another document set Pi'.

The module ComM 140 is also designed so as to establish a dependency between a document set Pi and a document set Pi' by determining the incorporation, into the set of documents Pi, of document elements of the document set Pi', and conversely the incorporation of document elements of the document set Pi' into the document set Pi. In other words, the module ComM 140 is designed to establish dependencies between document sets and to orient these dependencies.

It will be noted that, for practical reasons, the functions filterA( ), filterB( ) and cut( ) have to be arranged so that, for identical contents, the function signO( ) (or an equivalent function) arrives at at least one subset of signature values common to these contents. It may be desirable to apply the functions filterA( ), filterB( ) and cut( ), which are arranged identically, to the different contents which are to be compared, so as to obtain, via the function signO( ), sets of identical signature values when the contents are identical.

The module ComM 140 comprises a function for comparing document sets comp( ). The function comp( ) is arranged so as to compare a first set of documents P1 with a second set of documents P2 to determine the document elements common to the document sets P1 and P2.

The function comp( ) is described with reference to FIG. 12.

The function comp( ) is arranged so as to extract a subset E'1 from the base PDB 130 containing the signature values N1q relative to the set of documents P1 and the corresponding signature data V1q (step 1200). It is assumed here that there are Q1 different signature values N1q associated with the document set P1.

Optionally, the function comp( ) is designed so as to extract, in addition, all the data associated with the signature values N1q in the base PDB 130. For example, the function comp( ) may be arranged so as to extract a table of the same type as the table 1102 in FIG. 11.

In the same way, the function comp( ) is arranged so as to extract a subset E'2 from the base PDB 130 relating to the set of documents P2 (step 1202), and consisting of Q2 different signature values N2q'. For example, the function comp( ) may be arranged so as to extract a table of the same kind as the table 1104 in FIG. 11.

The function comp( ) is arranged so as to construct an intersection set E'12 consisting of the bringing together of subsets of the sets E'1 and E'2 whose signature values N1q and N2q' are equal (step 1204). In other words, the function comp( ) is arranged so as to draw up a table PintTb[ ] which combines the identical signature values N1q and N2q' of E'1 and E'2 as well as their respective signature data V1q and V2q'. If desired, the function comp( ) may be arranged so as to additionally store some or all of the data associated with these signature values in the base PDB 130.

The function comp( ) is arranged so as to establish a dependency set E"12. For example, the function comp( ) may be arranged so as to construct a table of dependencies PDepTb[ ] in which each row represents a dependency oriented between the document sets P1 and P2 (step 1206).

By "dependency" is meant the presence of a signature value N1q associated with the document set P1 in the set of signature values N2q' associated with the document set P2, and vice versa. In other words, a dependency between the document sets P1 and P2 reveals the presence in one of these sets of a document element of the other set.

The function comp( ) is arranged so as to draw up the table PdepTb[ ] such that each row in this table comprises:
  a signature value Nm,
  a reference to a source document set POm for this signature value (i.e. to one of the sets P1 or P2),
  a reference to a destination document set PDm for this signature value (i.e. the other one of the sets P1 or P2);
the table PdepTb[ ] being filled so as to count each signature value Nm of the set E'12, the references to the source document sets POm and destination document sets PDm being determined using an orientation function dir( ) starting from the signature data V1m and V2m, i.e. the values of the signature data V1q and V2q' corresponding to the signature value Nm in the sets E'1 and E'2, respectively. By the source document set is meant the document set from which the document element Cijlk with a signature value Nm has most probably been imported into the destination document set.

Each row in the table PdepTb[ ] represents an oriented dependency indicating a reference to a "source" document set POm and a reference to a "destination" document set PDm, for a signature value Nm.

Optionally, the table PdepTb[ ] may also store for each signature value Nm:
  a dependency attribute Fm, which may be established from the signature data V1m and V2m, for example a date of first appearance of the signature value Nm in the source document set POm,
  a document dependency attribute Gm, which may be established from the document attribute data W1q and W2q, for example data characterising the type of document from which the element generating the signature value has originated, or a reliability index of the time reference
  an element dependency attribute Hm, which may be established from the element attribute data Z1q and Z2q, for example an indication of the size of the element generating the signature value Nm.

If the document dependency attribute Gm comprises a datum characterising the type of document, it is possible to exclude the signature values Nm whose generating elements have originated from documents of a different type.

Determining the source document sets POm and destination document sets PDm may take account of different criteria. The function dir( ) may be arranged as a result.

In particular, the function dir( ) may be arranged so as to determine, as the source document set POm, the set of documents in which the document element generating the signature value Nm first appeared. In this case, the set POm is the set of documents in whose imprint the signature value Nm appeared earliest, whereas the set PDm may be the set of documents in which this signature value Nm only appeared later.

In a particular embodiment, the signature data V1m and V2m each contain a date of appearance TA1m and TA2m of the signature value Nm in the document sets P1 and P2, respectively. The function dir( ) can then be arranged so as to determine, as the source set POm, the particular one of the sets P1 and P2 which corresponds to the oldest of the dates TA1m and TA2m. The other one of the sets P1 and P2 is determined as the destination set PDm.

Optionally, the function comp( ) may be arranged so as to store the dates TA1m and TA2m as a dependency attribute Fm. The attribute Fm then corresponds to an interval of time during which a content of the document set POm was incorporated in the document set PDm.

In another embodiment, the signature datum V1m (or V2m, respectively) comprises a date of appearance TA1m (or TA2m, respectively) in the document set P1 (or P2, respectively) of the signature value N1m (or N2m respectively) and a date of disappearance TD1m (or TD2m, respectively) of this signature value Nm from this set. In this case, the function comp( ) may be arranged so as to establish the source sets POm and PDm as before and to keep as attribute Fm the date of disappearance TD1m or TD2m in the destination document set PDm.

Optionally, and for the embodiments described above, the document data W1m and W2m comprise a reliability index of the signature data V1m and V2m, particularly when these data contain appearance dates TA1m and TA2m. The function comp( ) can then be arranged so as to fill the table PdepTb[ ] solely with the signature values Nm wherein the document datum W1m or W2m is above a specified threshold value.

More generally, the function dir( ) may be arranged so as to determine the sets POm and PDm by taking account of the element attribute data Z1m and Z2m, the document attribute data W1m and W2m, the state attribute data X1m and X2m, and/or the signature data V1m and V2m.

For example, the function comp( ) may be arranged so as to establish as the set POm the particular one of the sets P1 and P2 corresponding to the oldest of the dates TA1m and TA2m, provided that the corresponding relevance index B1m, or B2m respectively, is above a specified value.

Optionally, the function comp( ) may be arranged so as to delete from the dependency table PdepTb[ ] the signature value Nm and the data associated therewith, one of the relevance indices B1m and B2m of which is below a predetermined value or wherein the dates of appearance TA1m or TA2m and TD1m or TD2m are spaced apart by a length of time which is greater than a fixed value.

Dependency Aggregation Functions

The function comp( ) may be arranged so as to call up an aggregation function capable of bringing together the dependencies of the table PdepTb[ ]. This is particularly advantageous when the number of dependencies in this table PdepTb[ ] is considerable.

A first example of an aggregating function agrDep1( ) is described with reference to FIG. 13.

The function agrDep1( ) is arranged so as to divide all the dependencies E"12 according to the orientation of the dependencies between two dependency subsets D12 and D21 which correspond respectively:
  to all the dependencies of E"12 such that POm is equivalent to P1, and
  to all the dependencies of E"12 such that POm is equivalent to P2. (step 1300)

For example, the function agrDep1( ) may be arranged so as to divide the table PdepTb[ ] between two sub-tables Pdep12Tb[ ] and Pdep21Tb[ ] which correspond respectively:
  to the rows in the table PdepTb[ ], i.e. to the signature values Nm and to the data associated with these values, such that POm is equivalent to P1, and
  to the rows in table PdepTb[ ], i.e. to the signature values Nm and to the data associated with these values, such that POm is equivalent to P2.

The set D12 comprises the set of signature values Nm whose associated appearance date TA1m is older than the associated appearance date TA2m (in other words less than this date). Similarly, the set D21 comprises all the signature values Nm whose associated appearance date TA2m is older than the associated appearance date TA1m. The aggregation of the subset D12. by the function agrDep1( ) will be described first of all.

Optionally, the function agrDep1( ) may be arranged so as to organise the sets D12 and D21 so as to combine the dependencies according to the date or dates associated with their signature value Nm.

The function agrDep1( ) is arranged so as to establish a number U12 of signature values Nm of the set D12. This can be done using a count function count( ) (step 1302).

The function agrDep1( ) is arranged so as to establish a date T12 on which any element of the set P1 was integrated in the set P2 for the first time. In other words the date T12 is the oldest date TA2m associated with the signature values Nm belonging to subset D12. (step 1304)

The function agrDep1( ) is arranged so as to establish a subset of dependencies, or aggregate, De12u of dependencies belonging to the set D12, whose date of appearance TA1m of the signature value Nm, or date on which a signature identical to the signature Nm was associated with the set P1 for the first time, is older than the date T12. In other words, the set De12u comprises the signature values Nm, and optionally data associated with these values, belonging to the set D12 whose appearance date TA1m is older than the date T12 (step 1306)

The function agrDep1( ) is arranged so as to establish a date T12' defined as being the oldest of the dates associated with the signature values Nm of the dependencies belonging to the set D12 but not belonging to the aggregate of dependencies De12u. In other words, the date T12' represents the oldest date on which a document element of the set P1 was integrated in the set P2 but wherein the signature Nm does not belong to the group being constructed. (step 1308)

Optionally, the function agrDep1( ) may be arranged so as to delete from the aggregate De12u, the dependencies wherein the date TA2m of first appearance of the signature value Nm in the set P2 is more recent than the date T12'. (step 1310)

The steps 1304 to 1310 are restarted, excluding the dependencies of the aggregates De12u already formed until the union of the sets De12u obtained is identical to the set D12. This can be done by excluding the dependencies from the set De12u which has just been constructed (step 1312) and by restarting steps 1304 to 1312 until the set D12 is empty (step 1314)

The function agrDep1( ) is arranged so as to carry out steps 1302 to 1314 for subset D21 symmetrically, in order to obtain aggregates of dependencies De21u the union of which corresponds to the subset of dependencies D21.

Optionally, the function agrDep1( ) may be arranged so as to establish, for each aggregate De12u (or De21u, respectively) aggregate data, particularly from the dependency attributes Fm, document dependency attributes Gm, element dependency attributes Hm associated with the signature values Nm of this aggregate. If desired, the function agrDep1( ) may be arranged so as to establish said aggregate data from the data V1m or V2m, W1m or W2m, and/or Z1m or Z2m.

For example, the function agrDep1( ) may be arranged so as to establish for each aggregate De12u (or De21u, respectively) a date of first integration of any element of the aggregate, i.e. the oldest of the dates TA1m associated with the signature values Nm of the aggregate in question. The function agrDep1( ) may, additionally or alternatively, be arranged so as to establish, for each aggregate:
  the number of signature values Nm (and hence dependencies) contained in the aggregate in question,
  a mean value for the reliability indices of the time references, calculated for example from the document dependency attributes Gm, and/or
  a value indicating the cumulative size of the document elements whose signature values Nm are included in the aggregate in question, for example calculated from the element dependency attributes Hm of these signatures.

Optionally, the function agrDep1( ) may be arranged so as to establish a datum characteristic of the probability of the aggregate. By the probability of the aggregate is meant, primarily, the fact that all the document elements whose signature values Nm are included in the aggregate in question arise from the same process of content integration. For example, the function agrDep1( ) may be arranged so as to check, for an aggregate De12u (or De21u, respectively) whether there is a time interval during which all the signature values of this aggregate co-existed in the imprint of the source document set.

It will be noted here that the addition of new states to one of the document sets P1 and P2 does not alter the dependencies of the set E"12 already counted, provided that these states are subsequent to the states from which the set E"12 was established. Moreover, the addition of new states does not modify the aggregates obtained by means of the function agrDep1( ) but can only modify the number of dependencies of these aggregates. In practice, irrespective of the addition or deletion of document elements in the sets P1 and P2, subsequent to the comparison, the dependencies established remain valid. For example, the deletion in set P2 of a document element from set P1 which has therefore generated a dependency does not cause the dependency to disappear. The comparison between sets of documents, as made possible by the invention, may therefore be described as "robust". This property is chiefly due to the fact that the timed imprint of a document set, as established by the module SignM 110, is not destroyed by the addition of subsequent states: new signature values may be added to the imprint but the signature data of the existing signature values are not modified, particularly in the case of a date of first appearance. In other words, the imprint of a document set on a specified date comprises the imprint of this document drawn up at an earlier date.

A second example of the aggregating function agrDep2( ) is described with reference to FIG. 14.

The function agrDep2( ) is arranged so as to divide all the dependencies E"12, according to the orientation of the dependencies, into two dependent subsets D12 and D21 in accordance with step 1300 in FIG. 13. (step 1400)

For each of the values of the date TA1u of first appearance in the document set P1, such that there is a signature value Nu contained within the set of dependencies D12, the function agrDep2( ) is arranged so as to establish a subset of dependencies, or aggregate, De12u comprising all the signature values Nm, and the data associated with these signature values, of which the date TA1m is identical to the date TA1u (step 1402). In other words, the function agrDep2( ) is arranged so as to divide the set D12 into aggregates De12u the signatures of which have the same date of appearance in the document set P1.

Optionally, the function agrDep2( ) may be arranged so as to determine the number of aggregates De12u included in the set D12, for example by means of a numbering function nbr( ), and to verify whether this number is greater than a predetermined value VAL (step 1404). The value VAL is equivalent to the number of aggregates judged reasonable to process. The value VAL may be determined by considering, on the one hand, that a high number of aggregates makes subsequent processing onerous and on the other hand a small number of aggregates causes a loss of information which may make the subsequent operation pointless. By the subsequent operation is meant in particular the processing carried out by the module RightsM 150.

If the test in step 1404 is negative, the function agrDep2( ) is stopped. If not, the function agrDep2( ) is arranged so as to determine a set of time intervals DeltaT12v, in a manner described hereinafter. (step 1406)

For each of the intervals DeltaT12v determined in step 1406, the function agrDep2( ) is arranged so as to construct a superset of dependencies, or aggregate, De12v containing the set of aggregates De12u such that the date TA1u is contained within the range DeltaT12v in question (step 1408). In other words, the function agrDep2( ) is arranged so as to combine the dependencies of the set D12 according to their signature value Nm as a function of the date of first appearance of this signature in the set of documents P1 and more precisely according to whether these dates belong to time intervals DeltaT12v. In certain cases, the construction of the aggregates De12v may take account of the date TA2u instead of the date TA1u.

The intervals DeltaT12v are determined so as to register a coherence in the process for producing the document elements. The determination of these intervals DeltaT12v may take one or more criteria into account.

For example, the function agrDept2( ) may be arranged so as to establish intervals DeltaT12v each of which corresponds to a state of the destination document set PDm, in this case the document set P2. The dependencies of the set D12 are thus regrouped as a function of the states of the destination document set. In this case, the function agrDep2( ) is arranged so as to define the aggregate De12v as a function of the dates TA2u.

The function or the date TA2u may also be arranged so as to determine the intervals DeltaT12v such that each of the intervals corresponds to a series of states of the document set wherein the values of the state attribute, particularly the contributor identifier Aij, are identical. The dependencies of the set D12 are then grouped as a function of the states of the source document set and by contributor.

Generally, the definition of the intervals DeltaT12v could result from a choice of time periods characteristic of the frequency of updating of the document contents, for example taken from data obtained by the version management tool, for example the dates Tij.

It will be understood that the function agrDep2( ) is arranged so as to carry out steps 1402 to 1408 symmetrically for the set D21.

Analogously to the function agrDep1( ), the function agrDep2( ) may be arranged so as to verify the probability of the aggregates De12v and De21v obtained.

Again analogously, the function agrDep2( ) may be arranged so as to establish, for each aggregate De12v, aggregate data, particularly from the dependency attributes Fm, the document dependency attributes Gm, the element dependency attributes Hm associated with the signature values Nm of this aggregate, and if appropriate from the data V1m or V2m, W1m or W2m, and/or Z1m or Z2m.

For example, the function agrDep2( ) may be arranged so as to establish for each aggregate De12v (or De21v, respectively) a date of first integration of any element of the aggregate, the number of signature values Nm (and hence dependencies) contained in the aggregate in question, a mean value of the reliability indices of the time references, and/or the cumulative size of the document elements whose signature values Nm are contained in the aggregate in question.

The functions agr1Dep( ) and agr2Dep( ) described here are not restrictive and other aggregation functions may be defined, additionally or alternatively. For example, the signature values Nm and the data associated with these values may be grouped according to their data Fm, Gm and/or Hm, and/or optionally according to the data V1m or V2m, W1m or W2m, and/or Z1m or Z2m.

In all the embodiments of the aggregation functions, these functions may also be arranged so as to establish a datum equivalent to a weight for each aggregate obtained. This makes it possible to establish a hierarchical structure for the aggregates so that later processing, for example, may be made easier. For example, the aggregation functions may be arranged so as to take into account, when determining said weight, the number of dependencies contained within the aggregate, the cumulative size of the document elements whose signature represents a dependency, a weight in the source and/or destination document set, the reliability of the time reference or references associated with the signatures of the aggregate, and any information available.

Second Embodiment of the Module for Comparing Document Sets

In this embodiment, the module ComM 140 is arranged so as to compare, in the sense described previously, one document set Pi with several document sets Pi'.

The module ComM 140 is arranged so as to establish a dependency between a document set Pi and document sets Pi', by determining the incorporation into the document set Pi of document elements from the document sets Pi', and conversely the integration in the document sets Pi' of document elements from the document set Pi. In other words, the module ComM 140 is arranged so as to ascertain dependencies between one document set and a number of document sets, and to orient these dependencies.

The module ComM 140 comprises a function for comparing document sets comp1N( ). The function comp1N( ) is arranged so as to compare a first document set P1 with document sets P2, P3 . . . , Pn, . . . PN, where N is a natural integer, in order to determine the document elements common to the document sets P1 and Pn, for every value of n.

The function comp1N( ) is described with reference to FIG. 15.

The function comp1N( ) is arranged so as to extract a subset E'1 from the base PDB 130 containing the signature values N1q relating to the document set P1 as well as the corresponding signature data V1q (step 1500). It is assumed here that there are Q1 different signature values N1q associated with the document set P1.

Optionally, the function comp1N( ) is arranged so as to extract, in addition, all the data associated with the signature values N1q in the base PDB 130. For example, the function comp1N( ) may be arranged so as to extract a table of the same type as the table 1102 in FIG. 11.

The function comp1N( ) is arranged so as to extract subsets E'n from the base PDB 130 relating to each document set Pn (step 1502), and consisting of Qn different signature values N1'. For example, the function comp1N( ) may be arranged so as to extract tables of the same type as the table 1104 in FIG. 11 for each document set Pn.

The function comp1N( ) is arranged so as to construct an intersection set E'1N made up by combining the intersection subsets of the set E'1 with each of the sets E'n. By the intersection between two sets is meant the set of signature values contained in the two sets at once and, if desired, the data associated with these signature values in both the sets (step 1504). In other words, the function comp1N( ) is arranged so as to establish a table PintTb[ ] which combines the signature values common to E'1 and to at least one of the sets E'n. For each common signature value, the function comp1N( ) is arranged so as to store, in the table PintTb[ ], the signature data associated with this signature value in the set E'1 and in each of the sets E'n where it is found. If desired, the function comp1N( ) may be arranged so as to store, in addition, some or all of the data associated with these signature values in the base PDB 130.

The function comp( ) is arranged so as to establish a dependency set E"1N. For example, the function comp1N( ) may be arranged so as to construct a dependency table PDepTb[ ] wherein each row represents a dependency oriented between the document set P1 and a document set Pn (step 1506).

The function comp1N( ) is arranged so as to establish the table PdepTb[ ] such that each row in the table comprises:
a value for the signature Nm,
a reference to a source document set POm for this signature value (i.e. to the set P1 or one of the sets Pn in particular),
a reference to a destination document set PDm for this signature value (i.e. the particular set Pn if POm is equivalent to P1, or the set P1 if POm is equivalent to the particular set Pn);

The table PdepTb[ ] is filled so as to count each signature value Nm of the set E'1N. The references to the source document set POm and destination document sets PDm are determined by means of an orientation function dir( ) starting from the signature data V1m and Vnm.

Each row in the table PdepTb[ ] represents an oriented dependency indicating a reference to a "source" document set POm and a reference to a "destination" document set PDm, for a signature value Nm.

Optionally, the table PdepTb[ ] may also store, for each signature value Nm:
a dependency attribute Fm, which may be established on the basis of the signature values V1m and Vnm, for example a date of first appearance of the signature value Nm in the source document set POm,
a document dependency attribute Gm, which may be established on the basis of the document attribute data W1q and Wnq, for example a datum characterising the type of document from which the signature value generating element has originated, or an index of reliability of the time reference,
an element dependency attribute Hm, which may be established on the basis of the element attribute data Z1q and Znq, for example an indication of the size of the signature value generating element Nm.

The determining of the source document sets POm and destination document sets PDm may take various criteria into account. The function dir( ) may be arranged as a consequence.

In particular, the function dir( ) may be arranged so as to determine, as the source document set POm, the document set wherein the document element generating the signature value Nm first appeared. In this case, the set POm is the document set in the imprint whose signature value Nm appeared first, whereas the set PDm may be the document set in which this signature value Nm only appeared later.

The different variants of the function comp( ) described previously may be transposed to the function comp1N( ) because it is important, on each occasion, to orient a dependency between two document sets, namely the set P1 and a set Pn.

The function comp1N( ) is thus arranged so as to establish a set E"1N of dependencies between the document set P1 and any one of the document sets Pn. In other words, each dependency (or signature value Nm) of the set E"1N characterises the presence of a document element of the set P1 in a document set Pn, with a source document set POm and a destination document set PDm.

This embodiment may be seen as the application of the function comp( ) of the first embodiment of the comparison module between the document set P1 and each of the document sets P2, . . . , Pn, . . . , PN.

In this embodiment, the function comp1N( ) may call up an aggregating function to combine the dependencies into aggregates, or subsets of the set E"1N.

In a first example, the function comp1N( ) is arranged so as to call up an aggregating function agrDep3( ). The function agrDep3( ) is arranged so as to divide the set of dependencies E"1N into subsets E"1n such that each of the subsets E"1n combines the dependencies between the document set P1 and the document set Pn in question. The function agrDep3( ) is also arranged so as to call up one of the aggregating functions of the first embodiment of the comparison module, particularly one of the functions agrDep1( ) and agrDep2( ), for each of the sets of dependencies E"1n.

In a second example, the function comp1N( ) is arranged so as to call up an aggregating function agrDep4( ). The function agrDep4( ) is arranged so as to delete, from the set of dependencies E"1N, for a particular signature value Nm, the dependencies between the set P1 and one of the sets Pn for which the date of appearance of the signature value Nm in the source set POm is not the oldest of all the dates of appearance of this signature value Nm in the set of document sets P1, P2, . . . , Pn, . . . , PN.

Optionally, particularly when the number of dependencies is too great, for example in order to be conveniently processed later, the function agrDep4( ) may be arranged so as to create aggregates as a function of the source document set POm. The function agrDep4( ) may also be arranged so as to create aggregates as a function of the states of the source document set. The function agrDep4( ) may also be arranged so as to create aggregates as a function of the following criteria:
state of the destination document set,
identifier of the contributor, and/or
time intervals,
analogously to the description provided earlier in the first embodiment of the comparison module.

As before, characteristic data may be attributed to the aggregates.

Third Embodiment of the Comparison Module

In this embodiment, the module ComM 140 is arranged so as to compare a number of document sets Pi with one another. The module ComM 140 comprises a comparison function compNN( ) arranged so as to call up, successively, the function comp1N( ) for each of the document sets Pi so as to establish a set of dependencies E"NN.

In one particular development, the function compNN( ) is arranged so as to delete from the set of dependencies E"NN, for a particular signature value Nm, the dependencies between two of the sets Pn for which the date of appearance of the signature value Nm in the source set POm is not the oldest of all the dates of appearance of this signature value Nm in the set of document sets P1, . . . , Pn, . . . , PN.

The dependencies can then be aggregated according to one or other of the functions described previously, either in combined manner or by replacement. In particular, the dependencies may be aggregated according to the destination document set PDm, i.e. the signature values Nm and the data associated with these data wherein the destination document set PDm is identical are combined.

As before, characteristic data may be associated with the aggregates thus obtained, such as the cumulative size of the document elements, which is obtained, for example, by totalling the element attributes AEijlk when the latter include an indication of the size of the element, or a mean value, possibly weighted by the relevance indices Bijlk associated with the document elements, the signatures of which are present in the aggregate in question, the oldest of the dates of first appearance in the destination set, or similar.

Rights Management Module

The rights management module RightsM 150 is arranged so as to interact with the module ComM 140 and the base PDB 130.

The module RightsM 150 comprises a listing function list( ) arranged so as to establish, for a document set Pi, the set of dependencies, i.e. of the signature values Nm and the data associated with these signature values, wherein the destination document set PDm is the document set Pi. If necessary, when the sets of dependencies E"12, E"1N or E"NN have been aggregated (i.e. when subsets of these sets of dependencies have been created), the function list( ) is arranged so as to draw up a list of these aggregates wherein an associated attribute is the destination document set PDm and this attribute is equivalent to Pi.

In a particular embodiment, the function list( ) is arranged so as to establish, for each of the signature values Nim present in the set of dependencies E"NN:
the set of references to the source document set POm (hereinafter designated Pi'),
the set of element attributes AEi',jqp,lqp,kqp associated with each of the source document sets Pi',
the set of document attributes AOi'jqp,lqp associated with each of the source document sets Pi', for example all the contributor identifiers Ai',jqp,
the set of state attributes ASi', jqp associated with each of the source document sets Pi', and/or
the set of time references of the document elements, for example the set of dates Ti',jqp.

In a particular development, the function list( ) is arranged so as to additionally establish:
the set of dependency attributes Fm, document dependency attributes Gm and/or element dependency attributes Hm, and/or
the set of attributes associated with each of the dependency aggregates, for example a dependency attribute indicative of a licence.

For example, the dependency attribute Fm may indicate a type of licence to which the source document set POm is subject.

In a particular development, the element attributes AEi', jqp,lqp,kqp comprise information identifying a type of licence (for example, "GPL licence", or "BSD" licence). The function list( ) is then arranged so as to establish a set of licences for the source document set Pi'. This makes it possible, for example, to establish a link between a dependency and a licence to assist in determining whether the operating criteria of the document set Pi are compatible with those of the set or sets Pi'.

In another particular embodiment, the list( ) function is arranged so as to establish equally a list of dependencies (or aggregates of dependencies) wherein the source document set POm is Pi, and an attribute of each destination document set PDm (in this case Pi') indicative of a type of licence.

In yet another embodiment, the list( ) function may be arranged so as to call up a function for verifying the incompatibility of licences liever( ), arranged so as to compare a type of licence of a source document set POm stored as a document set attribute and a type of licence of the destination document set PDm, which is also stored as a document set attribute, with a pre-established list of legal incompatibilities of licences. The list( ) function may be arranged so as to call up the liever( ) function for each dependency of the set E"NN.

In certain cases, the signature values Nim and Ni'm, as well as the data associated with them, could also be established by the list( ) function. In the case of the use of a version management tool which is arranged so as to preserve a record of the different amendments made to a document set, in this case the original document set and the destination document set, this may make it possible to assist the user in determining the ownership of rights relating to the different document sets.

In a particular embodiment, the list( ) function is arranged to as to establish, for a document set Pi, the signature values Nm found in the dependencies wherein the destination document set PDm is this document set Pi, and the signature values which are absent from every set of dependencies. Each signature value is associated with at least one signature datum Viq or Vi'q', and with a document datum Wiq or Wi'q', depending on the particular case. For example, the signature datum Viq or Vi'q' may comprise a date of first appearance (independently of the document set), and the document datum Wiq or Wi'q', an identifier of the document in which the content which generated this signature value was found for the first time.

On the other hand, the list( ) function may be arranged so as to establish the set of, or an extract from, the element attributes AEijlk, of documents AOijl, or of states ASij, associated in the base PDB 130, or WDB 120, with the document set Pi.

In a particular embodiment, for example, the document attributes AOi,jqp,lqp each comprise at least one contributor identifier and an indication of a status of this contributor (for example "employee", "private individual", or "researcher"). The function list( ) is then arranged so as to draw up a list of identifiers and their status.

Developments

The invention is of maximum value where each document is cut up into elements, each of which is associated with a signature. However, some of these documents may not be cut up into elements, for example where cutting up is of no purpose or has no value for the objective in question. In such cases, a signature may be associated with the document taken as a whole.

In the foregoing description, the cutting algorithm may be appropriate to each computer management system of a document set. It may be useful for the cutting algorithm to be standardised, depending on the nature of each file and/or desired objective. Thus, comparisons are made possible directly from one system to another.

The description provided above makes use of dates T. In some cases, date identifiers will be sufficient. By "date identifier" is meant here any parameter which is capable of forming the subject of a sorting operation that conforms to chronological order. Thus, a date identifier may simply be the version identifier in the document set.

Moreover, it is not always necessary to store all the signatures. It has been seen that it is possible to minimise the importance of certain signatures stored in a list which could be termed the "grey list". It is possible to envisage drawing up a "black list" of signatures which will not be stored, possibly under certain conditions.

Applications

The detailed description provided hereinbefore essentially falls within the scope of software development projects. The means described provide tools that can be automated and which make it possible in particular to define the legal status of software. It is known that this is a particularly difficult task, once there is a rise in the number of personal contributors, and their legal status, all the more so as this status may have developed over the course of time. The task is even more difficult when the software is based on components and/or has been developed by collaboration.

In view of this complexity of the task it is standard practice to define, purely intellectually, approximate but inexact solutions such as, for example:

an arbitrary qualification of collective work, simply because it has not been possible to resolve precisely which contribution each person has made and the corresponding allocation of rights, unreasonably overlooking contributions judged to be minor, faced with the personality of an influential author.

The invention makes it possible, on the contrary, to use rigorous, exact and reliable techniques with the degree of granularity which one hopes to find when breaking each document down into elements. This constitutes a key basic element in the evaluation and management of legal risk within the scope of the use or operation of software and particularly software which is distributed under an "open source" licence.

However, the invention is also suitable for other applications, at the level of the production chain for digital works, and/or the digitisation and traceability tools which such a process uses or calls upon. Within this scope are also found collaborative works and/or those based on re-usable components.

More generally, the invention is of particular value once it is possible to break the documents down into elements which are characteristic of an author and according to various criteria (authorship or copyright for a work), such that the comparison of the elements arising from the breaking down of two successive states is characteristic of the amendments made to the oldest state in order to produce a current or final version.

For the software (code), the breakdown makes use of the syntax and grammar of the language. By contrast, for a video/animation, the breakdown will depend on the storage format; a format such as SVG (standing for "Scalable Vector Graphics") is particularly well suited to defining a breakdown which is both effective and meaningful in terms of content.

The search for similarities between documents is carried out on the basis of the presence or absence of the elements found in the breakdown.

1. In contrast to the prior art, the timing of the imprint makes it possible to determine, as a function of the reliability of the time reference, when two software items have similarities, which one has been wholly or partly incorporated in the other, and in which version of the latter. For example, it is thus possible to determine:

(1) the legal status of an external contribution which has been duly identified without restricting oneself to the question of licence compatibility, (2) from which stage in the production chain the integrated part of the software originates, (3) the "distribution" of an open source code, i.e. its "notoriety", by identifying the projects which use it.

2. It makes it possible to carry out searches for exogenous codes without having to access the source codes directly.

3. The process is robust from the point of view of the production tool in the sense that an incremental updating of the record of the contributions (the addition of state subsequent to the last known state) could only extend the time signature, while optionally adding possible new signatures and hence new dependencies (atomic and aggregated), but without deleting the previous ones (it should be noted however that their relevance may be affected). The dependencies may be modified by taking account of new document sets in the comparison base. This is a key property from the point of view of the problem of traceability (i.e. from the point of view of quality control procedures).

4. The application of filters and algorithms for breaking down the content according to the type of file (for each language, in particular) makes it possible to ensure the permanence of the data, for example, by being unsusceptible to invisible portage from one system to another, and/or from one development environment to another. It is also possible to define cutting filters or functions which are proof against workaround strategies (for example a filter which is unsusceptible to a change in the name of a variable or to a block permutation which does not alter the functionalities).

5. The link between "content production tools", the generation of a timed imprint and the search for dependencies, in order to define the legal status of an item of software, makes it possible to take into account all the elements that make up the latter (list of authors and their status), including third party elements such as operating criteria.

6. It also makes it possible to define avoidance strategies when licence compatibility problems arise (for example when earlier or subsequent versions are subject to more permissive licences), when it is necessary to measure impact on the integration of contaminating exogenous code, or identify responsibilities (who incorporated the exogenous code, and when?).

7. It also makes it possible to characterise the activities of a particular contributor in terms of "content". For example, the number of atomic imprints generated makes it possible to define new metrics or to weight metrics on the activity in the sense of the production tool (i.e. the number of updates or the number of modified files). Optionally it may be possible also to take account of the relevance of the imprints (for example in order to propose co-ownership sections in a manner which is more pertinent and robust than simply the number of lines generated).

The foregoing relates particularly to software but may also apply to other types of works and more generally to other types of computer documents in which it is desired to carry out fine analysis coupled with a record of timing.

More generally, a process for computer management of documents is proposed here, which comprises a combination of the following steps:

a/ considering a first (j=1) document content (Oijl), having a first time reference (TPijl), b/ breaking down (200) this first document content into elements (Cijlk), in accordance with a selected rule, c/ associating (202) each document element (Cijlk) obtained in step b/ with a signature of its content (Nijlk), d/ storing, for the first document content, an imprint (Eijl), which comprises at least some of the signatures obtained in step b/, as well as an identifier of said first time reference of this first document content, e/ repeating steps a/ to d/ on each occasion (i=j+1) for at least one other document content, having its time reference, f/ considering a first signature value (Nijlk) as a working value (Niq), g/ applying a time clock function (dat( )) to the time reference identifiers (TPijl) of the imprints (Eijl) containing this working value, and associating this working value (Niq) with the result value (Viq) of said time clock function., as a unified time reference, h/ repeating steps f/ to h/ with, on each occasion, another signature value (Nijlk) as working value (Niq), i/ storing a correspondence between each signature value and its unified time reference.

In principle, the document contents (Oijl) can be identified (or graded) according to at least two categories selected from among: a given document, a document state, a document version, and a document set capable of including several document versions. Consequently, in the detailed description that follows, the expression "document content" may relate to a precise document (l), a document state (j), a document version, or a document set (i) except where the context indicates otherwise.

In the detailed description provided hereinbefore, all four categories are present. In principle, up to the level of the document set, the same finality is maintained: this is the development of what is perceived to be the same thing. By contrast, two different document sets relate to two different things, at least in part.

In a valuable embodiment, notably for researching potentially creative contributions:

the time clock function (dat( )) is arranged so as to establish, as signature datum (Viq), at least one selected from the identifier of the oldest time reference (TPi,jqp,lqp) on the list and the identifier of the most recent time reference (TPi,jqp,lqp) on the list.

It may be useful to single out at least some document elements, for example in order to modify their importance. To this end:

step c/ comprises the fact of each document element (Cijlk) additionally being associated with an element attribute (AEijlk) relating to this document element, in step d/, the imprint (Eijl) also comprises an identifier of at least some of the element attributes (AEijlk), in step g/, the time clock function (dat( )) is arranged so as to take into account the element attribute identifiers (AEijlk), for time election, particularly if they verify a condition.

In particular embodiments which may be combined with one another:

in step d/, the imprint (Eijl) comprises signatures of the elements wherein the element attribute (AEijlk) is greater than a specified value, in step c/, the element attribute depends on statistical data relating to the content of the document element.

Equally, it may be useful to single out at least some of the documents themselves. To this end:

in step a/, the document content (Oijl) also has a document attribute (AOijl), in step d/, the imprint (Eijl) also comprises an identifier of said document attribute of the first document content, step g/ further comprises the fact of applying an authentication function (Aut( )) to the document attribute identifiers (AOijl) of the imprints (Eijl) containing the working value, and associating this working value (Niq) with the result value (Wiq) of said authentication function, as a unified document attribute datum, step i/ also comprises the fact of storing a correspondence between each signature value and its unified document attribute datum.

In a particular embodiment of the foregoing:

in step g/, the authentication function is also applied to the time reference identifiers of the imprints (Eijl) containing the working value.

According to other particular embodiments which may be combined and which are more generally applicable:

the document content attribute (AOijl) comprises an identifier of a contributor to said document content (Oijl).

it is envisaged (for example in step d/) that at least one known document content structure (Oijl) should be recognised and, in the presence of a document whose structure has been recognised, that this document should be associated with a datum (702) characteristic of this structure, which is involved in establishing the imprint (Eijl).

it is envisaged (for example in step a/) that a cleaned up document content (O'ijl) should be established on the basis of a document content (Oijl), according to a first set of predetermined rules, which depend on said datum characteristic of the structure of the document content (Oijl), whereas the series of operations b/ to d/ are carried out on the basis of this cleaned up document content (O'ijl).

it is envisaged (for example in step b/) that a cleaned up document element (C'ijlk) should be established from a document element (Cijlk) according to a second set of predetermined rules, particularly dependent on the datum characteristic of the structure of the document (Oijl), whereas the series of operations b/ to d/ is carried out on the basis of the cleaned up document elements (C'ijlk) thus obtained.

In this way it is possible to obtain a number of imprints, corresponding to a number of document contents.

In order to bring them together, the process may be completed as follows:

for a given signature value (Niq), a list of time reference identifiers (TPi,jqp,lqp) is determined for the imprints (Ei,jqp,lqp) which contain this signature value (Niq), and a unified time reference (Viq) is established for each signature value (Niq), searching for the identifier of the oldest time reference (Tpi,jqp,lqp), on the list (or applying another time criterion, such as the search for the most recent time reference (Tpi,jqp,lqp) on the list).

Thus, for the given signature, it is possible to supplement (or replace) its initial time reference with the unified time reference (Viq).

For its part, each document content is provided with a list of time reference identifiers (TPijl), which can be compared with a global list containing all the time references (TPijl) of the document contents (Oijl). For a document content, one or more time periods are taken from this. Such a time period comprises successive time references in relation to the set of time references (TPijl). It represents the period during which a document element having a given signature has been continuously present in a document content.

The time references may be defined in different ways, perhaps by inputting.

It is preferable to use a tool for managing document content versions and for storing in the memory, from this version management tool, time references (TPijl) for document contents.

Similarly, the contributor identifiers may be defined in different ways, possibly by inputting. It is preferable to use, once again, a version management tool and to store in the memory, from this version management tool, at least one contributor identifier for each of the document contents (Oijl).

Of course, the version management tool may also indicate different versions, having different contents, for what is globally viewed as a single document, at different phases of its development or life. It may even indicate sub-versions or "states". Starting from a plurality of document contents (Oijl), the version management tool may establish the subset of document contents (Oijl) which are different from one another. In this case it is sufficient to apply operations a/ to c/ only once, on the basis of said subset of document contents (Oijl). All the useful signatures are then calculated before the operation d/.

It has been seen that the process envisages storing the correspondence between each signature value and its time reference. It may also be useful to store a link, for example an identifier, to the set of document contents (Oijl) from which the signature value and time reference has originated. Thus, for a given time signature, there is a set of document contents which contain this signature.

The bringing together of the document contents may show up common parts. In principle they have the same source, which can be searched by examining the dependencies. To do this:

α a first set of imprints (E'1) and a second set of imprints (E'2) are compared, having a first identifier (1) and a second identifier (2), respectively.

The first set of imprints (E'1) comprises signature values (Niq) and their unified time references (Viq) corresponding to the first identifier (1). Also the second set of imprints (E'2) comprising signature values (N2q) and their unified time references (V2q') corresponding to said second identifier (2).

β the set of successful comparisons provides a subset of dependencies (E"12).

For each signature value (N1q;N2q) common to them, this subset contains corresponding unified time references (V1q; V2q') for said first and second sets of imprints.

γ a direction or orientation of each dependency is defined (or predefined). The most common method is to place the origin or "source" at the earliest time and the destination or "target" (PDm) at later times. Generally, this implies a set of predetermined rules, applied on the basis of the unified time references (V1q; V2q'). Looking at the first identifier (1) and the second identifier (2), the imprints of which have a common signature value (N1q), this operation of orientation makes it possible to qualify one of the first and second identifiers (1;2) as the original or "source" identifier (POm) and the other identifier (2;1) as the destination or "target" identifier (PDm).

A document content may be broken down into a few elements or a great many elements, depending on the context and the selected granularity for this decomposition. With a fine granularity, i.e. a large number of (document) elements, the subset (E"12) of dependencies (oriented or not) will also comprise a great many elements. It is thus useful to search for the elements in the same situation, which can be called an "aggregate". The subset (E'12) may be divided up according to the orientation of the dependencies and then dependency aggregates (De12u; De21u) may be created respectively, on the basis of the iterative application of at least one of the following dividing criteria:

taking the oldest (1304) common signature (Nm) which has not yet been grouped, and grouping it with the other common signatures (Nm) arising from time references on the "source" side which are earlier than this oldest (1306) common signature (Nm), taking out, from a given group, a common signature whose "target" time reference is subsequent to the oldest signature among the common signatures which have not yet been grouped (1310), the iteration being carried out until a given end of loop criterion is verified.

A multi-document comparison can also be carried out, on N sets of imprints (N document contents). In this case:

all the possible 1 to 1 comparisons are carried out on the N documents (or on some of them). There are in total N(N−1) possible comparisons. This provides a plurality of dependency subsets, which when joined together produce a dependency set.

the dependencies are oriented as described previously.

for each signature in these dependency subsets (or in the dependency set), the dependencies whose "target" time reference, for the signature in question, is subsequent to the oldest state among the N sets of imprints, for the signature in question, are removed.

This comparison may be carried out at a higher level, for example between N document sets as defined previously.

In an application such as rights management, the process may include the following step:

establishing a dated list of contributors, verified from the imprints and any dependencies.

The invention also encompasses the programs which can be executed, or programs produced, which are capable of animating the computer device described, and/or of implementing the corresponding processes. An executable program of this kind may be made available in any computer-readable "medium" (support). The term "computer-readable medium" encompasses supports for storing data which are magnetic, optical and/or electronic, as well as supports or vehicles for transmission, such as analogue or digital signals.

The invention is not restricted to the embodiments described above but includes all the variants which may be imagined by the skilled man.

The invention claimed is:

1. Computer-based device for managing documents comprising a memory for storing document contents having time references, the device comprising:
    an extractor configured to break down a document content into document elements according to a given rule;
    a signature generator configured to process one or more of the document elements for returning a signature value characteristic of an element content of each of the one or more of the document elements;
    an imprint generator configured to establish, for the document content, an imprint including a time reference identifier for the time reference of the document content, and at least one or more of the signature values obtained in response to invoking the extractor for transforming the document content into the document elements, and in response to invoking the signature generator based on the one or more of the document elements;
    a time clock module configured to calculate a result value of a time election function based on a list of time reference identifiers;
    a supervisor module configured to:
        operate the imprint generator on at least two document contents for producing at least two imprints having a plurality of the signature values;
        for each particular signature value selected from the plurality of the signature values, invoke the time clock module with a list of a plurality of the time reference identifiers of the imprints containing the particular signature value for calculating the result value, the calculated result value identifying a unified time reference for the particular signature value, wherein for each particular signature value which is common to the at least two imprints of the at least two document contents, invoke the time clock module with a list of the time reference identifiers of the at least two imprints of the at least two document contents having said particular signature value which is common, said time reference identifiers in the list identifying a plurality of different times; and
        storing an association between each particular signature value and the corresponding unified time reference.

2. The device according to claim 1, wherein the time election function, calculated by the time clock module, is configured to determine, as the result value, at least one time reference identifier selected from an oldest time reference identifier on the list and a most recent time reference identifier on the list.

3. The device according to claim 1, further comprising a content qualifier configured to process one of the document elements for returning an element attribute relating to the processed document element.

4. The device according to claim 3 wherein:
    the imprint established by the imprint generator includes at least some element attribute identifiers of a plurality of element attributes of the corresponding document content, wherein the element attribute identifiers are included in response to invoking the content qualifier for the document elements obtained from the extractor,
    said time election function is configured to take into account the element attribute identifiers, for time election, and
    the supervisor module is configured to invoke the time clock module with the associated element attribute identifiers.

5. The device according to claim 3, wherein:
    the imprint generator is configured to establish, for the document content, an imprint which comprises the time reference of the document content, and the signature values of the document elements whose element attribute verifies a specified condition.

6. The device according to claim 3, wherein the content qualifier is configured to process a document element for returning, as element attribute, the result value of a statistical function relating to the content of the document element.

7. The device according to claim 1, at least some of the documents also each having at least one document content attribute, wherein:
    the imprint generator is configured to establish, for the document content, an imprint which also comprises an identifier of the attribute of the document content.

8. The device according to claim 7, further comprising:
    an authentication module configured to calculate a result value of a document attribute electing function, from a list of identifiers of attributes of document contents, as a function of a list of time reference identifiers.

9. The device according to claim 8, wherein:
    the supervisor module is configured to:
    invoke the authentication module with the list of the identifiers of attributes of document contents of the imprints which contain the particular signature value for providing a unified document content attribute datum for each particular signature value, and
    store an association between each particular signature value and the corresponding unified document content attribute datum.

10. The device according to claim 7, wherein the document content attribute comprises an identifier of a contributor to said document content.

11. The device according to claim 1 further comprising:
    a qualifier module configured to recognize at least one known structure of the document content and, in response to the document having a recognized structure, associating with the document a datum characteristic of the structure, wherein the imprint generator is configured to call up the qualifier module to establish the imprint.

12. The device according to claim 11 further comprising:
    a first filtering module configured to establish, from the document content, a cleaned-up document content cleaned up according to a first set of rules, the first set of rules depending on said datum characteristic of the structure of the content of the document, wherein the imprint generator is configured to call up, for the document, the first filtering module for obtaining the cleaned-up document content, and further configured to establish an imprint in response to invoking the extractor for transforming the cleaned-up document content into elements, and in response to invoking the signature generator based on the one or more of the document elements.

13. The device according to claim 11 further comprising:
a second filtering module configured to establish, from the document element, a cleaned-up document element cleaned up according to a second set of rules, the second set of rules depending on the datum characteristic of the document structure, wherein the imprint generator is configured to call up, for a document, the second filtering module for obtaining cleaned-up document elements from the document elements obtained in response to invoking the extractor, and further in response to invoking the signature generator based on the cleaned-up document elements.

14. The device according to claim 1, wherein the supervisor module is configured to call up the time clock module with a list of all the time reference identifiers of the imprints that contain the particular signature value, to supply a unified time reference for the particular signature value.

15. The device according to claim 1, wherein the supervisor module is configured to call up the time clock module for each particular signature value with the time reference identifier for the imprint containing the particular signature value and the unified time reference for the particular signature value, to supply a new unified time reference for the particular signature value.

16. The device according to claim 1, wherein the time clock module is configured to compare said list of time reference identifiers with a set of time references of the document contents, and to deduce from the comparison, as the result value, identifiers of time periods in said list, each time period being made up of successive time references relative to the set of time references.

17. The device according to claim 1, further including an interface for interacting with a version management tool for managing versions of document contents, said memory receiving, from said version management tool, time references for the document contents.

18. The device according to claim 17, wherein the version management tool is also configured to associate a contributor identifier with each of the document contents, said memory also receiving the associated contributor identifiers.

19. The device according to claim 17, wherein the supervisor module is configured to:
interact with the version management tool for establishing, from a plurality of document contents, a subset of document contents which are different from one another,
operate the imprint generator on each of the document contents of said subset for obtaining imprints which together have a plurality of signatures,
invoke for each of the signature values obtained for the subset, the time clock module with a list concurrently including the time identifiers of the imprints obtained from the subset and the time identifiers of each of the document contents that are identical to the document content of the subset from which the signature value has originated.

20. The device according to claim 1, wherein the supervisor module is further configured to:
store, in addition to the association between each particular signature value and the corresponding unified time reference, an identifier for the set of document contents from which the particular signature value and the unified time reference have originated.

21. The device according to claim 20 further comprising:
an imprint comparator configured to compare a first set of imprints and a second set of imprints, having a first identifier and a second identifier, respectively, the first set of imprints comprising signature values and the unified time references corresponding to the first identifier, and the second set of imprints comprising signature values and the unified time references corresponding to said second identifier, a set of successful comparisons providing a subset of dependencies, with, for each signature value that is common to the subset of dependencies, corresponding unified time references for said first and second sets of imprints,
an orientation module configured to qualify, for a common signature value, one of the first and second identifiers as a source identifier and another one of the first and second identifiers as a target identifier, according to a set of preset rules, based on the unified time references,
the imprint comparator being configured to invoke the orientation module for each signature value of said subset of dependencies with the corresponding unified time references, providing a distinction between a source and a target.

22. The device according to claim 21, wherein the orientation module is configured to establish, as an identifier of a set of source document contents, the identifier corresponding to an oldest unified time reference.

23. The device according to claim 22, further comprising a module for dividing said subset of dependencies between said first and second sets of imprints, the dividing module being configured to divide said subset according to an identifier of an origin of the signatures, and respectively create aggregates of dependencies based on an iterative application of at least one dividing criteria selected from a group consisting of:
taking an oldest common signature which has not yet been grouped, and grouping the oldest common signature with other common signatures arising from time references on a source side which are earlier than the oldest common signature, and
removing, from a given group, a common signature whose target time reference is later than an oldest signature among the common signatures which have not yet been grouped,
wherein the iterative application continues until a given end-of-loop criterion has been verified.

24. The device according to claim 21 further comprising:
a multi-document comparator configured to receive N sets of imprints, and further configured to perform oriented comparisons, from one of the sets of imprints to another, for at least some of the signatures, the multi-document comparator being further configured to provide by comparing at least one of the sets of imprints with others, a plurality of dependency subsets, and, for each signature in the dependency subsets, removing dependencies whose target time reference, for a signature in question, is later than an oldest date among the N sets of imprints, for the signature in question.

25. The device according to claim 21, further comprising a global document management module configured to draw up a dated list of contributors, verified based on the imprints and any dependencies.

26. The device according to claim 1, wherein the document contents are configured to be identified according to at least two categories selected from a group consisting of a given document, a document state, a document version, and a set of documents likely to contain several document versions.

27. The device according to claim 1, wherein the storing the association includes:
 associating to a set of document contents including said at least two document contents, a digital imprint including said plurality of the signature values and indicating, for each signature value of said plurality of the signature values, the unified time reference identified for the signature value, and a correspondence between the signature value and the document element from which the signature value was generated.

28. The device according to claim 27, wherein said time election function is adapted to determine as the result value at least one of an identifier of the oldest time reference of the list or an identifier of a most recent time reference of the list.

* * * * *